(12) United States Patent
Nguyen et al.

(10) Patent No.: US 11,258,805 B2
(45) Date of Patent: Feb. 22, 2022

(54) COMPUTER-SECURITY EVENT CLUSTERING AND VIOLATION DETECTION

(71) Applicant: CrowdStrike, Inc., Irvine, CA (US)

(72) Inventors: Cory-Khoi Quang Nguyen, Lafayette, IN (US); Jaron Michael Bradley, Mason, MI (US); John Lee, Cleveland, OH (US); Brody Nisbet, Newcastle (AU)

(73) Assignee: CrowdStrike, Inc., Irvine, CA (US)

( * ) Notice: Subject to any disclaimer, the term of this patent is extended or adjusted under 35 U.S.C. 154(b) by 384 days.

(21) Appl. No.: 16/367,561

(22) Filed: Mar. 28, 2019

(65) Prior Publication Data
US 2020/0314117 A1    Oct. 1, 2020

(51) Int. Cl.
*H04L 29/06* (2006.01)
*G06F 16/906* (2019.01)
*G06F 17/18* (2006.01)
*G06K 9/62* (2006.01)

(52) U.S. Cl.
CPC ........ *H04L 63/1416* (2013.01); *G06F 16/906* (2019.01); *G06F 17/18* (2013.01); *G06K 9/6219* (2013.01); *H04L 63/145* (2013.01)

(58) Field of Classification Search
CPC .............. H04L 63/1416; H04L 63/145; G06F 16/906; G06F 17/18; G06F 21/552; G06F 21/554; G06K 9/6219
See application file for complete search history.

(56) References Cited

U.S. PATENT DOCUMENTS

| 10,565,373 B1* | 2/2020 | Rao ................... G06F 21/552 |
| 2016/0357966 A1 | 12/2016 | Porat et al. |
| 2018/0121443 A1* | 5/2018 | Bao ................... G06F 40/242 |
| 2018/0150724 A1 | 5/2018 | Brock |

(Continued)

FOREIGN PATENT DOCUMENTS

| EP | 2860658 | 4/2015 |
| WO | WO2013164821 | 11/2013 |

OTHER PUBLICATIONS

Marin et al, "A Hybrid Approach to the Profile Creation and Intrusion Detection", 2001, IEEE, p. 1-8.*

(Continued)

*Primary Examiner* — Christopher A Revak
(74) *Attorney, Agent, or Firm* — Lee & Hayes, P.C.

(57) ABSTRACT

An event can be associated with a monitored computing device and a command-line record. An event vector can be determined for each of a plurality of events based at least in part on at least a portion of the respective command-line record and on a trained representation mapping. A respective reduced event vector can be determined having fewer elements. The reduced event vectors can be clustered to determine cluster identifiers. A first event can be determined to be associated with a security violation based on a corresponding cluster identifier matching a cluster identifier of a second event that is associated with a security violation. In some examples, a cluster can include a relatively larger first group of events and a relatively smaller second group of events. That cluster can be determined to satisfy a criterion based on the numbers of events in at least one of the groups.

20 Claims, 14 Drawing Sheets

(56) References Cited

U.S. PATENT DOCUMENTS

| | | | |
|---|---|---|---|
| 2018/0307833 A1 | 10/2018 | Noeth et al. | |
| 2019/0007434 A1 | 1/2019 | McLane et al. | |
| 2020/0092306 A1* | 3/2020 | Jusko | G06F 16/285 |
| 2020/0106789 A1* | 4/2020 | Boros | G06K 9/6223 |
| 2020/0159916 A1* | 5/2020 | Nguyen | G06F 11/3006 |
| 2020/0311262 A1 | 10/2020 | Nguyen et al. | |
| 2021/0064749 A1* | 3/2021 | Weizman | G06F 21/561 |

OTHER PUBLICATIONS

Extended European Search Report dated Aug. 18, 2020 for European Patent Application No. 20161180.3, 10 pages.

Extended European Search Report dated Aug. 21, 2020 for European Patent Application No. 20159521.2, 15 pages.

Berendsen, R., "Implementing doc2vec", Luminis, Jan. 30, 2017, 12 pages.

Kevin et al., "word2vec-doc2vec—How Does the Inference Step Work in PV-DBOW—Data Science Stack Exchange", Aug. 2018, 3 pages.

Le et al., "Distributed Representatios of Sentences and Documents", Google Inc., May 22, 2014, 9 pages.

McInnes, L., "How HDBSCAN Works", Nov. 9, 2017 (commit e20ddd9). retrieved Mar. 21, 2019 from <<https://hdbscan.readthedocs.io/en/latest/how_hdbscan_works.html>>, 16 pages.

Van der Matten, et al., "Visualizing Data Using t-SNE", Journal of Machine Learning Research, Nov. 2008, V. 9, pp. 2579-2605.

Office Action for U.S. Appl. No. 16/367,616, dated Jun. 3, 2021, Nguyen, "Computer-Security Violation Detection using Coordinate Vectors", 24 Pages.

* cited by examiner

COMPUTER-SECURITY EVENT CLUSTERING AND VIOLATION DETECTION

CROSS-REFERENCE TO RELATED APPLICATIONS

Not applicable.

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, macros or scripts embedded in document files, steganographic encodings within media files such as images, or other types of computer programs, or combinations thereof.

Another type of cyber attack is a "targeted" attack, e.g., by an adversary operating as an advanced persistent threat (APT). Targeted attacks often attempt to gain command-line access to target systems. Targeted attacks may use malware, or may use other techniques that do not require running malware on target systems. Examples include phishing and exploits that compromise benign software. For example, a benign program with administrative privileges may be compromised using a remote zero-day attack to provide an adversary with unauthorized administrative access to a system, even without the use of malware. Additionally or alternatively, an adversary may steal the credentials of a legitimate user, access the system as that user, and then elevate privilege level (e.g., using those credentials, or by exploiting a vulnerability). This may permit the adversary to use normal administrative tools, but without authorization. Given the wide variety of attack types, it is challenging to determine if activity taking place on a computer is malicious.

As used herein, the terms "adversary" or "adversaries" include not only malware developers but also exploit developers, builders and operators of an attack infrastructure, those conducting target reconnaissance, those executing targeted operations, those performing data exfiltration, those maintaining persistence in the network, etc. Thus the "adversaries" can include numerous people or other entities that are all part of an "adversary" group.

To counter these threats, governments, enterprises, and individuals use a range of security applications and services. Typically, these applications and services scan a device for a signature of a security exploit such as a piece of malware. Responsive to finding the signature, the applications and services quarantine or delete the exploit. The applications and services often miss more sophisticated security violations, however, such as non-malware malicious activity (e.g., an adversary's login session).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
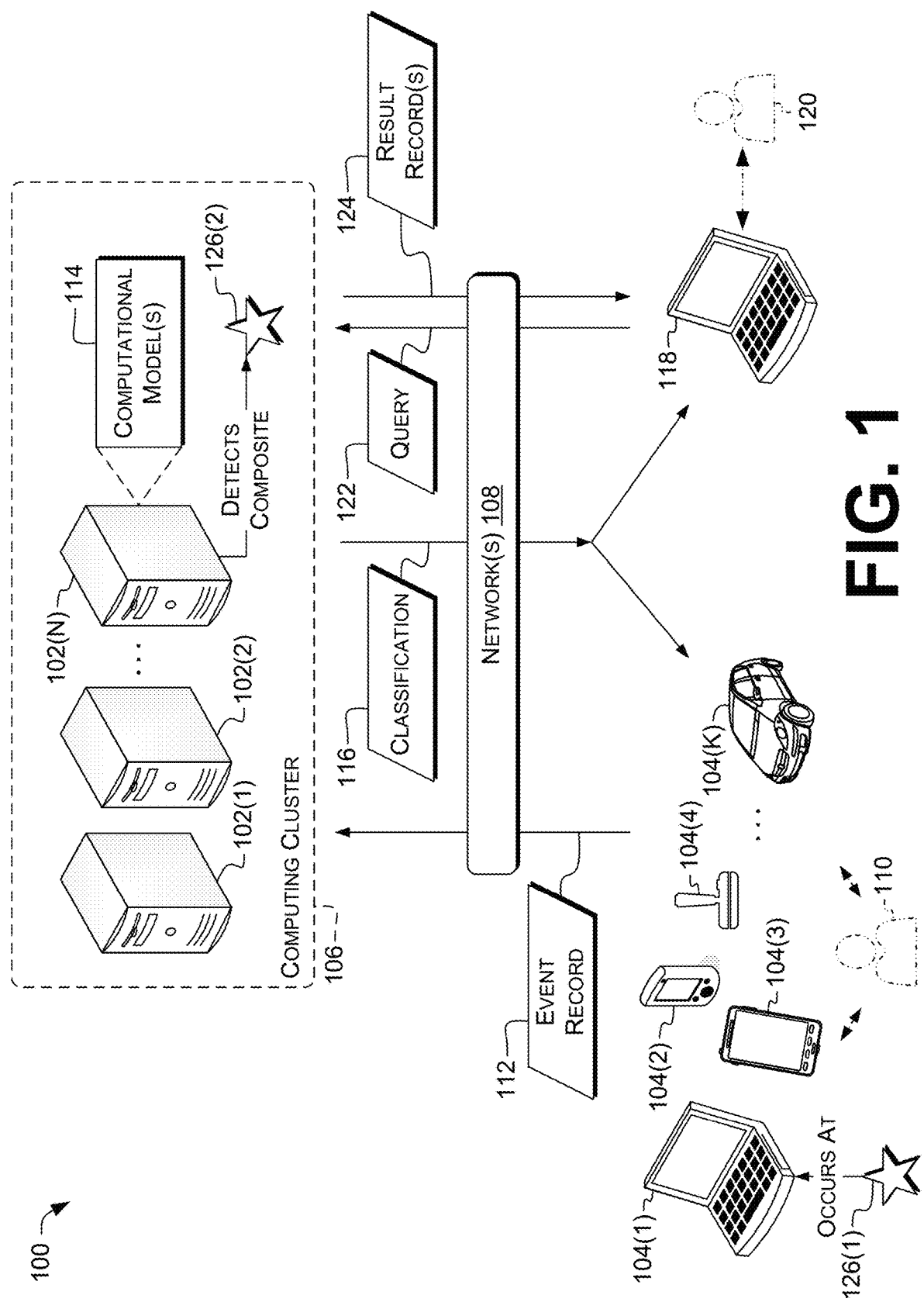
FIG. 1 is a block diagram depicting example scenarios for performing security analysis of events as described herein.

Some examples herein relate to classification of events occurring at a monitored computing device to determine whether those events are associated with a security violation, e.g., malicious. Some examples permit correlating data from multiple events to locate events that are likely to be associated with a security violation, or to locate events that have been mis-classified. Some examples permit determining whether a session (e.g., a login session) is associated with a security violation (e.g., under control of an adversary) based on data from multiple events in that session and in other sessions.

Some examples herein relate to analysis of events occurring at a monitored computing device to determine coordinate vectors associated with those events. The coordinate vectors can then be presented or otherwise used in determining whether those events are associated with a security violation, e.g., malicious. Some examples include presenting representations of the events with respect to their coordinate vectors via a user interface to permit more effectively distinguishing groups of related events.

For brevity, events or other security-relevant data are described herein as "associated with a security violation" (or "computer-security violation") if those events or other data are at least one of: associated with malware; associated with or performed by an APT adversary; performed or generated while conducting, preparing to conduct, or attempting to conduct malicious activities; or otherwise performed or generated while attempting to gain or use, or gaining or using, unauthorized access to a computing system or network. Paras. [0050]-[0054] give various examples of events associated with security violations.

Throughout this document, "dirty" is used for brevity to refer to events associated with security violations, such as malware or other malicious components or behavior (e.g., any of the examples listed in the Background); feature vectors representing such events; or other values associated with, produced by, or indicative of malware, malicious behavior, or other security violations (e.g., activity by an APT adversary). "Clean" is used to refer to events or values that are not dirty. A "false detection" or "false positive" is a determination that an event is associated with a security violation when, in fact, that event is not associated with a security violation, or the event that is the subject of such a determination. A "false miss" or "false negative" is a determination that an event is not associated with a security violation when, in fact, that event is indeed associated with a security violation, or the event that is the subject of such a determination. Throughout this document, unless otherwise specified, references to an event can refer to a sequence of events that are represented by a single higher-level event. That is, an event can represent any number or arrangement of subsidiary events. In some examples, an event is an example of the Component in the Composite design pattern.

Throughout this document, a "data stream" can include data stored in, e.g., a file, a disk boot sector or partition root sector, or a block of memory, or a portion thereof. For brevity, the term "sample" herein refers to a data stream, or a portion of a data stream, being analyzed separately from at least one other portion of the data stream. A sample can include, e.g., an individual malware file, a user file such as a document, a benign executable, or a malware-infected user file. In some examples of a data stream representing a multi-file archive (e.g., ZIP or TGZ), an individual file within the multi-file archive can be a sample, or the archive as a whole can be a sample. Some examples determine or use a classification indicating, e.g., characteristics of a sample (e.g., a data stream) or an event related thereto.

In some examples, each of one or more monitored computing devices is equipped with a security agent (e.g., a service or daemon process) to monitor events on that device. Those monitored computing devices may be in communication with devices of a security service system, e.g., implemented using cloud technology. The security service system can filter and analyze events, and present to security analysts only events associated with security violations. This can, e.g., reduce the volume of events from thousands per second to a few per minute, permitting analysts to triage and research the suspicious events. Some examples perform this filtering based on behavior, permitting the detection of previously-unknown threats.

While example techniques described herein may refer to analyzing events that may potentially be malicious, it is understood that the techniques may also apply to other types of events, e.g., produced by non-malicious software, processes, or other system components. For example, techniques described herein can be used in determining which processes are accessing particular files or other system resources, or in analyzing causes of excess resource usage by processes. Accordingly, analysis of events as discussed herein may be used by, for example, anti-malware security researchers, white-hat vulnerability researchers, interoperability developers, anti-piracy testers, or other analysts of data streams. In some examples, the described techniques are used to detect, and prevent execution of, malicious actions at a computer. In some examples, techniques described herein can be used to detect malicious activity without requiring detection of a specific software package or version. This can provide increased robustness against polymorphic malware and against zero-day exploits used by APT adversaries. Some examples are described with reference to malware, but techniques described herein are not limited to files or events associated with malware.

Various entities, configurations of electronic devices, and techniques for performing security analyses, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs). As used herein, a "random" value can be a truly random value, e.g., measured from physical phenomena, or a pseudorandom value. Examples of random values include cryptographically-strong random numbers.

In some examples, the techniques discussed herein can be implemented on or for a monitored computing device and can include detecting an event, e.g., an action of interest (AoI), committed or triggered by an object (i.e., a function, module, process, or thread) executed by the monitored computing device. Some techniques discussed herein can detect that an event is related to a security violation based at least in part on analyzing command lines associated with that event. In some examples, the techniques can take preventative action (e.g., blocking an object associated with the event) without input from a user. This can greatly increase the ease of implementing security for a computing device and may prevent greater damage from occurring due to a violation by stopping the violation before it has progressed beyond preliminary actions or events.

For brevity and clarity herein, several Perl notations are used. "$ name= . . . " defines an entity called "name" with the value " . . . ". "qr { . . . }" represents the Perl (or Perl-compatible, PCRE) regular expression " . . . ". "q{ . . . }" represents the literal text " . . . ", except that "\{" is replaced with "{" in " . . . ", and likewise "\}" with "}" and "\ V" with "\". "qw{ . . . }" represents the list of whitespace-delimited items in the string " . . . ". For example, qw {'hello 42' 1337} is the list with the three items "'hello", "42'", and "1337".

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein. Section headers in this Detailed Description are solely for convenience in reading. Some examples include features from only one section. Some examples include features from more than one section. Use of the terms "first," "second," and similar in the Detailed Description does not imply or require chronological order unless expressly stated.

Illustrative Environment

FIG. 1 shows an example scenario 100 in which examples of security-analysis or security user-interface systems can operate or in which security analysis or user-interface techniques such as those described herein can be performed. Illustrated devices or components of scenario 100 include computing device(s) 102(1)-102(N) (individually or collectively referred to herein with reference 102), for integer N≥1, and computing devices 104(1)-104(K) (individually or collectively referred to herein with reference 104), for integer K≥1. In some examples, N=K; in other examples, N<K or N>K. Although illustrated as, e.g., desktop computers, laptop computers, tablet computers, or cellular phones, computing device(s) 102 or 104 can include a diverse variety of device categories, classes, or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (e.g., computing device(s) 102) that work together to accomplish a computing task assigned to the cluster as a whole. In some examples, computing device(s) 104 can be clients of cluster 106 and can submit jobs to cluster 106 or receive job results from cluster 106.

In some examples, computing devices 102 or 104 can intercommunicate or communicate with external device(s), e.g., via one or more network(s) 108, to participate in or carry out computational-model determination or operation as described herein. For example, computing device 104(1) can be or include a monitored computing device or other data source owned or operated by or on behalf of a user, and computing device 102(1) can be a computational-model determination and operation system, as described herein. Network(s) 108 can include public networks such as the Internet, private networks such as an institutional or personal intranet, or combination(s) of private and public networks. Communications between computing devices 102 or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services or Representational State Transfer (REST) API endpoint. Remote Procedure Call (RPC) APIs or other types of APIs can additionally or alternatively be used for network communications.

In some examples, computing devices 102 or 104 interact with or are operated by an entity 110 (shown in phantom). The entity 110 can include systems, devices, parties such as users, or other features with which computing devices 102 or 104 can interact. For brevity, examples of entity 110 are discussed herein with reference to users of a computing device 104; however, these examples are not limiting.

In the illustrated example, computing devices 104 transmit event records 112 to computing devices 102. Computing devices 102 filter and otherwise handle the event records 112 to determine whether events associated with the event records 112 are associated with security violations or are otherwise suspicious. For example, computing devices 102 can determine or operate computational model(s) (CM(s)) 114, or other algorithms such as clustering or dimensionality-reduction algorithms, to determine an output corresponding to event(s) on a user's computing device 104. For example, the output can include a classification 116 indicating whether or not the event(s) are associated with a security violation. In response to an output indicating a security violation, computing devices 102 can apply a "tag" to each event record 112 associated with the security violation, e.g., by storing data of the classification 116 or other tag in the event record 112. Tags can be represented as, e.g., strings (e.g., "dirty.malware"), enumerated values (e.g., 1 for malware, 2 for targeted activity, 3 for other dirty, or 4 for clean), or XML tags or other structured text. The computing device(s) 102 can provide to computing device(s) 104 the classification 116 or other outputs of processing using computational models described herein.

Computing device(s) 102 can store one or more CM(s) 114, individually or collectively referred to herein with reference 114. In some examples, algorithms for determining CM(s) 114 as described herein can be performed on computing device(s) 102.

In some examples, classification 116 is provided to computing device(s) 104. This can permit computing device(s) 104 to, e.g., take mitigation actions or advise entit(ies) 110 of an event associated with a security violation. Additionally or alternatively, classification 116 can be provided to computing device(s) 118 (for brevity, only one is shown), e.g., operated by entity 120 (shown in phantom). Entity 120 can be a security analyst working for a security service, in some examples. Additionally or alternatively, entity 120 can include systems, devices, parties such as users, or other features with which computing devices 118 can interact. For brevity, examples of entity 120 are discussed herein with reference to security analysts using a computing system; however, these examples are not limiting.

In some examples, computing device 118 (e.g., operated by an entity 120 such as a security analyst) can transmit a query 122 (e.g., a search query) to cluster 106. Cluster 106 can respond to computing device 118 with result record(s) 124 corresponding to event record(s) 112 satisfying the query 122. For example, query 122 can include at least one tag criterion, and result record(s) 124 can include event record(s) 112 that have been tagged (e.g., operations 940, 1330) with tag(s) matching the at least one tag criterion. Computing device 118 can then present at least some of the result record(s) 124 to entity 120 via a user interface. In some examples, a query 122 includes a selection 928 (FIG. 9), and a result record 124 includes a highlight of a representation (operation 1310).

Throughout this document, any determination that a particular data item "satisfies" a query or criterion is equivalent to a determination that that data item fails to satisfy an inverse query or criterion. For example, in a system in which each record is tagged with exactly one of the three tags "Dirty," "Clean," and "Unknown," a query 122 for all records tagged "Dirty" is equivalent to a query 122 for all records that are not tagged "Clean" and that are also not tagged "Unknown." Accordingly, discussion of queries and criteria throughout specifically contemplates the use of inverted queries or criteria with inverted senses of what satisfies a query or criterion.

As noted above, an event can represent a single occurrence at a monitored computing device 104, or can represent one or more (e.g., multiple) other events or sub-events. In some examples, a classification 116 or result record 124 can be associated with a specific event record 112, or with a composite event or other event not directly represented by a specific event record 112 from a monitored computing device 104. Any of these types of events are referred to herein individually or collectively with reference 126, and are graphically depicted as stars. In the illustrated example, an event 126(1) occurs at monitored computing device 104(1), and is represented by an event record 112. Event 126(2) is a composite event detected by computing device 102(N).

Different devices or types of computing devices 104, 118 can have different needs or ways of interacting with cluster 106. For example, cluster 106 can interact with discrete request/response communications to computing devices 104 to determine additional data. Additionally or alternatively, computing devices 104 can be data sources (e.g., running security agents) and can interact with cluster 106 with discrete or ongoing transmissions of event records to be handled. For example, a data source in a personal computing device 104(1) can provide to cluster 106 data of events such as file installations, process launches, or writes to system files. Additionally or alternatively, computing devices 104 can be data sinks and can interact with cluster 106 with discrete or ongoing requests for data output from CMs 114, e.g., updates to blacklists or other security-relevant information.

In various examples, e.g., of CM(s) 114 for classifying events or other use cases noted herein, the CM(s) 114 may include, but are not limited to, multilayer perceptrons (MLPs), neural networks (NNs), gradient-boosted NNs, convolutional NNs (CNNs), deep neural networks (DNNs) (i.e., neural networks having at least one hidden layer between an input layer and an output layer), autoencoders (e.g., DNNs in which the dimensionality of the hidden-layer outputs is smaller than that of the input layer or the output layer), recurrent neural networks (RNNs) such as long short-term memory (LSTM) networks or Gated Recurrent Unit (GRU) networks, transformer neural networks (arXiv: 1706.03762 [cs.CL]), decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMMs). In some examples of DNNs, the hidden layer has fewer neurons than the input layer does, and the hidden layer has fewer neurons than the output layer does. In these examples, the hidden layer is an example of a chokepoint layer. In some examples, the DNN includes more than one hidden layer. The CMs 114 can additionally or alternatively include regression models, e.g., linear or nonlinear regression using mean squared deviation (MSD) or median absolute deviation (MAD) to determine fitting error during the regression; linear least squares or ordinary least squares (OLS); fitting using generalized linear models (GLM); hierarchical regression; Bayesian regression; or nonparametric regression.

The CMs 114 can include parameters governing or affecting the output of the CM 114 for a particular input. Parameters can include, but are not limited to, e.g., per-neuron, per-input weight or bias values, activation-function selections, neuron weights, edge weights, tree-node weights, or other data values. A training module 226, FIG. 2, can be configured to determine CMs 114, e.g., to determine values of parameters in CMs 114. For example, CMs 114 can be determined using an iterative update rule such as gradient descent (e.g., stochastic gradient descent or AdaGrad) with backpropagation.

In some examples, the training module 226 can determine the CMs 114 based at least in part on "hyperparameters," values governing the training. Example hyperparameters can include learning rate(s), momentum factor(s), minibatch size, maximum tree depth, maximum number of trees, regularization parameters, dropout, class weighting, or convergence criteria. In some examples, the training module 226 can determine the CMs 114 in an iterative technique or routine involving updating and validation. The training data set can be used to update the CMs 114, and the validation data set can be used in determining (1) whether the updated CMs 114 meet training criteria or (2) how the next update to the CMs 114 should be performed.

The computing device(s) 102 can be configured to use the determined parameter values of trained CM(s) 114 to, e.g., categorize or classify an event or event sequence with respect to association with malware or with a targeted attack, or to perform other data analysis or processing. In some examples, the computing device 104 can be configured to communicate with computing device(s) 102 to operate a CM 114. For example, the computing device 104 can transmit a request to computing device(s) 102 for an output of the CM(s) 114, receive a response (e.g., a classification 116), and take action based on that response. For example, the computing device 104 can provide to entity 110 information included in the response, or can quarantine or delete file(s) indicated in the response as being associated with a security violation. In some examples, computing device 104 can transmit event record(s) 112 to cluster 106, and cluster 106 can push notifications of classification(s) 116 to computing device 104 in response to a determination that an event is associated with a security violation.

Throughout this document, a "feature vector" is a collection of values associated with respective axes in a feature space. Accordingly, a feature vector defines a point in feature space when the tail of the feature vector is placed at the origin of the M-dimensional feature space. Feature vectors can often be represented as mathematical vectors of, e.g., scalar or vector values, but this is not required. The feature space can have any number M of dimensions, M≥1. In some examples, features can be determined by a feature extractor, such as a previously-trained CM or a hand-coded feature extractor. The term "feature vector" permits any particular element of a feature vector to be the output of a computation determined through feature engineering, but does not require that. For example, features can be hidden-neuron outputs of a word-proximity model such as a word2vec or doc2vec (individually or collectively, "x2vec") model, e.g., as discussed below with reference to FIG. 3-5, 7, 9, or 11.

In some examples example, the classification 116 includes a rational or real number (e.g., in floating- or fixed-point representation), a bitmask, an attribute list, a softmax output, or another representation of categories to which the event represented by or associated with an event record 112 belongs, as determined by CM(s) 114. For example, classification(s) 116 or result record(s) 124 can include Boolean value(s) indicating whether or not corresponding event(s) are associated with security violation(s). Additionally or alternatively, classification(s) 116 or result record(s) 124 can include enumerated value(s) indicating with which (if any) of several categories the analyzed event(s) are associated (e.g., "benign," "virus," or "spyware"). In some examples, a benign event is indicated by a classification 116 that does not indicate that the event is associated with a category indicative of a security violation (e.g., "benign" is the absence of another category, rather than the presence of a "benign" category). Classification 116 can additionally or alternatively include one or more confidence values or other values indicating the likelihood of a classification, e.g., a "spyware" value of 0.42 indicating a 42% likelihood that the event is, e.g., an attempt to install spyware. In an example, classification 116 can include multiple confidence values for respective categories of malware (e.g., "spyware=0.42; worm=0.05").

An event (or sequence of events, or composite event, and likewise throughout this document) can be associated with a security violation (e.g., an intrusion or other malicious behavior) if, e.g., the event was produced by malicious code (e.g., malware) or at least a portion of a grouping of malicious code (e.g., a benign file modified by a file infector virus); the event was triggered by a generator commonly used for generating malware (e.g., a packer or installer); or the event relates to creation or use of an input file relied on by malware (e.g., a large sequence of data designed to trigger a buffer overflow that will permit remote code execution, or shellcode embedded in a document file). Examples of security violations or activity associated therewith can include: the specific exploitation of a vulnerability (e.g., to gain the ability to execute code on a computing device 104 or to elevate privileges on the computing device 104); the use by an adversary of stolen credentials to run commands via an administrative protocol such as Windows Management Instrumentation, WMI, or other exploitation of user credentials and remote-access or system-management protocols or tools to gain unauthorized access to a computing device 104.

In an example of generators, a data stream may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with a security violation, and events related to the decruncher may be indicated as such by the classification 116. Malicious code, generators, shellcode, and other data streams described in this paragraph are referred to for brevity as "associated with a security violation."

In some examples, malware comprises malicious data instead of or in addition to malicious code. Such data is also considered to be associated with a security violation, and events triggered by or otherwise related to such data can be considered to be associated with security violations. For example, some programs may have bugs that prevent them from correctly processing certain inputs. Examples include Structured Query Language (SQL) injection attacks, in which a program populates a query with unescaped external data. For example, the query template "SELECT cost from Products WHERE name LIKE '%{$name}%';" can be abused by providing malicious data to be populated in place of the placeholder "{$name}". When the malicious data $name="foo"; DROP TABLE Products; --" is substituted into the query template, for example, the resulting query will cause the "Products" table of the database to be deleted ("dropped"), causing unexpected loss of data.

In another example, malicious data can include malformed UTF-8 (Unicode Transformation Format-8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with a security violation.

For generators and other examples or use cases described herein, a determination that an event is associated with a security violation does not necessarily require or guarantee that the event indeed be triggered by malware or a targeted attack, or that any data stream related to the event in fact be associated with a security violation. For example, some generators and input streams are used for malware, and are also used for legitimate software. In some examples, classification 116 can be used by a security analyst (e.g., entity 120) in triaging events, and can permit the security analyst to readily separate events based on a likelihood they are in fact associated with malware or targeted attacks. In some examples, a computer-security system can delete or quarantine files associated with security violations, or terminate processes launched from data streams associated with a security violation or represented in events associated with security violations.

Except as expressly indicated otherwise, a determination of whether a data stream or event is associated with malware or another security violation is carried out programmatically by or using CM(s) 114 or other algorithms, e.g., according to techniques herein. Various examples herein can be performed without human judgment of whether an event or data stream is in fact malicious. Using CM(s) 114, clustering or dimensionality-reduction algorithms, or other techniques herein can permit identifying potential computational threats, e.g., in the context of an antivirus program, cloud security service, or on-premises security appliance, more readily than in some prior schemes.

By way of example and not limitation, computing device(s) 102 or 104 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104(2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out computational-model determination or operation as described herein, e.g., for file-analysis or malware-detection purposes.

In some examples, computing devices 102(1)-102(N) in cluster 106 can, e.g., share resources, balance load, increase performance, or provide fail-over support or redundancy. Computing devices 104 can additionally or alternatively operate in a cluster or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, or network connectivity are provided (for example, through a rental agreement) over a network, such as the Internet. As used herein, the term "computing" used with reference to computing clusters, nodes, and jobs refers generally to computation, data manipulation, or other programmatically-controlled operations. The term "resource" used with reference to clusters, nodes, and jobs refers generally to any commodity or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space or mounting/unmounting services, electrical power, etc. Cloud resources can be provided for internal use within an organization or for sale to outside customers. In some examples, computer security service providers can operate cluster 106, or can operate or subscribe to a cloud service providing computing resources.

In other examples, cluster 106 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

Network(s) 108 can include any type of wired or wireless network, including but not limited to local area networks (LANs), wide area networks (WANs), satellite networks, cable networks, Wi-Fi networks, WiMAX networks, mobile communications networks (e.g., 3G, 4G, and so forth) or any combination thereof. Network(s) 108 can utilize communications protocols, such as, for example, packet-based or datagram-based protocols such as Internet Protocol (IP), Transmission Control Protocol (TCP), User Datagram Protocol (UDP), other types of protocols, or combinations thereof. Moreover, network(s) 108 can also include a number of devices that facilitate network communications or form a hardware infrastructure for the networks, such as switches, routers, gateways, access points, firewalls, base stations, repeaters, backbone devices, and the like. Network(s) 108 can also include devices that facilitate communications between computing devices 102 or 104 using bus protocols of various topologies, e.g., crossbar switches, INFINIBAND switches, or FIBRE CHANNEL switches or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, or WiMAX.

As noted above, network(s) 108 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Different networks have different characteristics, e.g., bandwidth or latency, and for wireless networks, accessibility (open, announced but secured, or not announced), or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
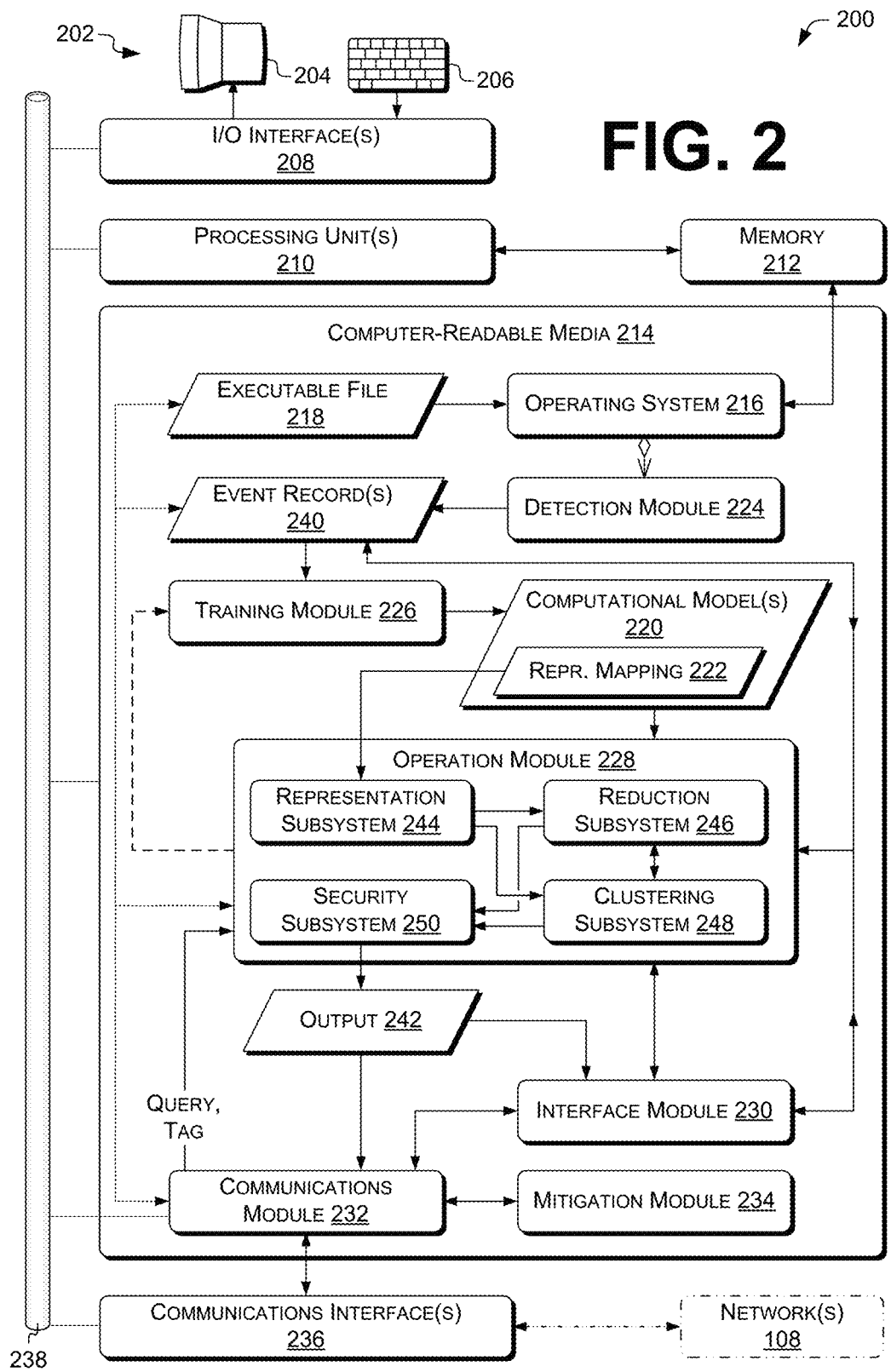
FIG. 2 is a block diagram depicting an example computing device configured to participate in performing security analysis of events according to various examples described herein.

FIG. 2 is an illustrative diagram that shows example components of a computing device 200, which can represent computing device(s) 102 or 104, and which can be or implement a security-analysis or security-event user-interface system, device, or apparatus, according to various examples described herein. Computing device 200 can include or be included in a system or device for determining or operating a computational model, analyzing events, or permitting interaction with events via a user interface, as described herein. In some examples, computing device 200 can be or include at least a portion of a computer-security system.

Computing device 200 can include or be connected to a user interface (UI) 202. In some examples, UI 202 can be configured to permit a user, e.g., entity 110, 120 or a computational-model (CM) administrator, to operate the CM(s) 114 or to place other techniques herein into service, or to control or otherwise interact with cluster 106 or computing devices 102 therein. Accordingly, actions such as presenting information of or corresponding to an output of a CM 114 to entity 110, 120 can be taken via UI 202.

In some examples, UI 202 can include various types of output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display. For example, display 204 can present a rendered view of a Web page served by computing device(s) 102. Display 204 can be a component of a touchscreen, or can include a touchscreen.

UI 202 can include a user-operable input device 206 (depicted as a keyboard). User-operable input device 206 can include one or more input devices, integral or peripheral to computing device 200. The input devices can be user-operable, or can be configured for input from other computing device 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 110, 120, via UI 202.

Computing device 200 can further include one or more input/output (I/O) interface(s) 208 to allow computing device 200 to communicate with input, output, or I/O devices (for clarity of the drawing, only some are depicted). Examples of such devices can include components of UI 202, such as user-operable input devices 206 and output devices such as display 204. Other examples of such devices can include power meters, accelerometers, and other devices for measuring properties of entity 110, computing device 200, or another computing device 102 or 104. Computing device 200 can communicate via I/O interface 208 with suitable devices or using suitable electronic/software interaction techniques. Input data, e.g., of user inputs on user-operable input device 206, can be received via I/O interface 208 (e.g., one or more I/O interface(s)). Output data, e.g., of user-interface screens, can be provided via I/O interface 208 to display 204, e.g., for viewing by a user.

The computing device 200 can include one or more processing unit(s) 210. In some examples, processing unit(s) 210 can include or be connected to a memory 212, e.g., a RAM or cache. Processing units 210 can be operably coupled to the I/O interface 208 and to at least one computer-readable medium 214 (CRM), e.g., a tangible non-transitory computer-readable medium.

Processing unit(s) 210 can be or include one or more single-core processors, multi-core processors, CPUs, GPUs, GPGPUs, or hardware logic components configured, e.g., via specialized programming from modules or APIs, to perform functions described herein. For example, and without limitation, illustrative types of hardware logic components that can be used in or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA (INTEL) or XILINX that includes a CPU core embedded in an FPGA fabric. These or other hardware logic components can operate independently or, in some instances, can be driven by a CPU. In some examples, at least some of computing device(s) 102 or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media or communication media. Computer storage media includes tangible storage units such as volatile memory, nonvolatile memory, or other persistent, non-transitory, or auxiliary computer storage media, removable and non-removable computer storage media implemented in any technique or technology for storage of information such as computer-readable or -executable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 200.

In contrast to computer storage media, communication media can embody computer-readable or -executable instructions, data structures, program modules, or other data in a modulated data signal, such as a carrier wave, or other transmission mechanism. As defined herein, computer storage media does not include communication media.

In some examples, CRM 214 can store instructions executable by the processing unit(s) 210, or instructions executable by external processing units such as by an external central processing unit (CPU) or external processor of any type discussed herein. Any of these instructions are referred to herein as computer-executable instructions or processor-executable instructions. For example, CRM 214 can store instructions of an operating system (OS) 216. CRM 214 can additionally or alternatively store at least one executable file 218, e.g., a user program, device driver executable, or system-service/daemon executable, or another system component. In some examples, OS 216 can cause processing unit(s) 210 to load the computer-executable instructions from executable file 218 into a RAM or other high-speed memory, e.g., memory 212, or to otherwise prepare computer-executable instructions from executable file 218 for execution by processing unit(s) 210. Some examples, e.g., bare-metal embedded-systems configurations, can include a loader but not an OS 216. Examples herein are discussed with reference to executable file 218 and can additionally or alternatively be used for other types of files, e.g., data files.

In some examples, a "control unit" as described herein includes processing unit(s) 210. A control unit can also include, if required, memory 212, CRM 214, or portions of either or both of those. For example, a control unit can include a CPU or DSP and a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing computer-executable instructions.

Computer-executable instructions or other data stored on CRM 214 can include at least one computational model (CM) 220, which can represent CM(s) 114, FIG. 1. CM 220 can be stored as data (e.g., parameters); as code (e.g., for testing branch points in a decision tree); or as a combination of data and code. CM 220 can include a representation mapping 222. The representation mapping 222 can include a computational model, e.g., a neural network. Additionally or alternatively, the representation mapping 222 can include at least some parameters of a CM, e.g., parameters to be locked during training of a Doc2vec model such as that described below with reference to operation 314. Additionally or alternatively, the representation mapping 222 can include a lookup table, e.g., determined based at least in part on (e.g., extracted from) a trained computational model. The term "mapping" refers to the change of domain from command-line information (e.g., extracted terms) to vectors representing events, and does not require (although it does permit) that representation mapping 222 include a LUT, hash table, or similar structure.

Computer-executable instructions or other data stored on CRM 214 can include instructions of the OS 216, a detection module 224, a training module 226, an operation module 228, an interface module 230 (which can represent a user-interface subsystem), a communications module 232, a mitigation module 234, or other modules, programs, or applications that are loadable and executable by processing unit(s) 210. Processing unit(s) 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the OS 216 or the above-listed modules 224-234.

For brevity, discussions of functions performed "by" module(s) (or similar terms) refer, in the context of processor-executable instructions, to functions performed in response to processor-executable instructions of the referred-to module(s). In the context of FPGAs or other control units not using processor-executable instructions, discussions of functions performed "by" module(s) refer to functions performed by the special-purpose logic or other configuration of those module(s). Various aspects herein may be embodied as computer program products including computer-readable program code ("program code") stored on a computer-readable medium, e.g., a tangible, non-transitory computer-readable medium.

In some examples not shown, one or more of the processing unit(s) 210 in one of the computing device(s) 102 or 104 can be operably connected to CRM 214 in a different one of the computing device(s) 102 or 104, e.g., via communications interface 236 (discussed below) and network 108. For example, program code to perform steps of flow diagrams herein, e.g., as described herein with reference to modules 224-234, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 236, which can include a transceiver or other network-interface device such as a network interface controller (NIC) to send and receive communications over a network 108 (shown in phantom), e.g., as discussed above. As such, the computing device 200 can have network capabilities. Communications interface 236 can include any number of network, bus, memory, or register-file interfaces, in any combination, whether packaged together or separately. In some nonlimiting examples, the communications interface 236 consists of a network interface. A bus communications interface 236 can include, e.g., an expansion-card bus interface (e.g., PCI Express), a display bus interface (e.g., HDMI or DISPLAYPORT), or a peripheral-device bus interface (e.g., USB or THUNDERBOLT). In some examples, communications interface 236 can include a memory bus internal to a particular computing device 102 or 104, transmitting or providing data via communications interface 236 can include storing the data in memory 212 or CRM 214, and receiving via communications interface 236 can include retrieving data from memory 212 or CRM 214. In some examples, communications interface 236 can include a datapath providing a connection to a register file within a processor. For example, a first software module can load parameters into the register file via the datapath, and then and issue a function call to a second software module. The second software module can retrieve the parameters from the register file and return a result via the register file.

In some examples, the communications interface 236 can include, but is not limited to, a transceiver for cellular (3G, 4G, or other), WI-FI, Ultra-wideband (UWB), BLUETOOTH, or satellite transmissions. The communications interface 236 can include a wired I/O interface, such as an Ethernet interface, a serial interface, a Universal Serial Bus (USB) interface, an INFINIBAND interface, or other wired interfaces. The communications interface 236 can additionally or alternatively include at least one user-interface device or user interface, at least one bus such as a memory bus, datapath, or local bus, at least one memory interface, or at least one hardwired interface such as a 0-20 mA control line.

In some examples, the OS 216 can include components that enable or direct the computing device 200 to receive data via various inputs (e.g., user controls such as user-operable input device 206, network or communications interfaces such as communications interface 236, devices implementing memory 212, or sensors), and process the data using the processing unit(s) 210 to generate output. For example, the communications module 232 and communications interface(s) 236 can receive event data representing an event associated with a monitored computing device 104, e.g., as discussed herein with reference to event record 112, 240, command-line record 306, 308, or event data 404. The OS 216 can further include one or more components that present the output (e.g., display an image on an electronic display 204, store data in memory 212, or transmit data to another computing device 102 or 104. The OS 216 can enable a user (e.g., entity 110) to interact with the computing device 200 using a UI 202. Additionally, the OS 216 can include components that perform various functions generally associated with an OS, e.g., storage management and internal-device management.

In some examples, the processing unit(s) 210 can access the module(s) on the CRM 214 via a bus 238. I/O interface 208 and communications interface 236 can also communicate with processing unit(s) 210 via bus 238. Bus 238 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses (e.g., of any of the types described herein with reference to bus communications interface 236), or any combination thereof.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the training module 226 and the operation module 228 can be combined in a single module that performs at least some of the example functions described below of those modules, or likewise the communications module 232 with either the training module 226 or the operation module 228, the communications module 232 and the mitigation module 234, or the communications module 232 and the detection module 224. In some examples, CRM 214 can include a subset of the above-described modules.

In the illustrated example, the communications module 232 can receive event record(s) 240, as represented by the stippled arrows. In some examples, detection module 224 e.g., running at a monitored computing device 104, can detect activity at monitored computing device 104 and determine corresponding event record(s) 240. Examples of detection are discussed below. In some examples, communications module 232 can transmit event record(s) 240 determined by detection module 224, e.g., to cluster 106. The event records 240 can include separate training records and trial records. Additionally or alternatively, at least some of the event records 240 can be used both as training records and as trial records (e.g., initially as trial records, then later, at a time of retraining of CM 220, as training records).

In the illustrated example, the training module 226 can determine at least part of the CM 220, e.g., the representation mapping 222. The representation mapping 222 can be determined, e.g., based at least in part on at least one training event record of the event record(s) 240, which can represent event record(s) 112. For example, the training module 226 can update parameters of a neural network, or rebuild or update a decision forest, based at least in part on event record(s) 240 or event data therein, e.g., command-line data.

Various examples of training or operation of a CM 220 can include initializing CM 220 with random parameter values, then performing gradient-descent, backpropagation, or other iterative parameter-updating techniques to update the parameter values of CM 220. Various examples train CM 220 on a set of training data, and validate performance of CM 220 on a set of validation data. Various examples then use CM 220 to evaluate test data.

In some examples, the training module 226 can perform a supervised learning technique or routine to determine a trained CM 220, e.g., using labeled training data. For example, the training data can include events 126, 302 or command-line texts 310 (FIG. 3) collected at monitored computing device(s) 104 or other computing device(s), together with, for each item 126, 302, 310, a respective benign vs. malicious indication (or other classification 116 or result record 124), e.g., determined by entit(ies) 120 or by other analysis techniques such as those described herein. In some examples, the classification training data can include substantially equal numbers of benign and malicious samples. In other examples, the classification training data can include a number of benign samples that is substantially different from the number of malicious samples. In still other examples, the classification training data can include some repeats, selected at random, to control the ratio of benign data to malicious data in the classification training data. In some examples, the number of benign samples in the classification training data is higher than the number of malicious samples, e.g., by about 5%, about 10%, or about 15%.

Figure 3:
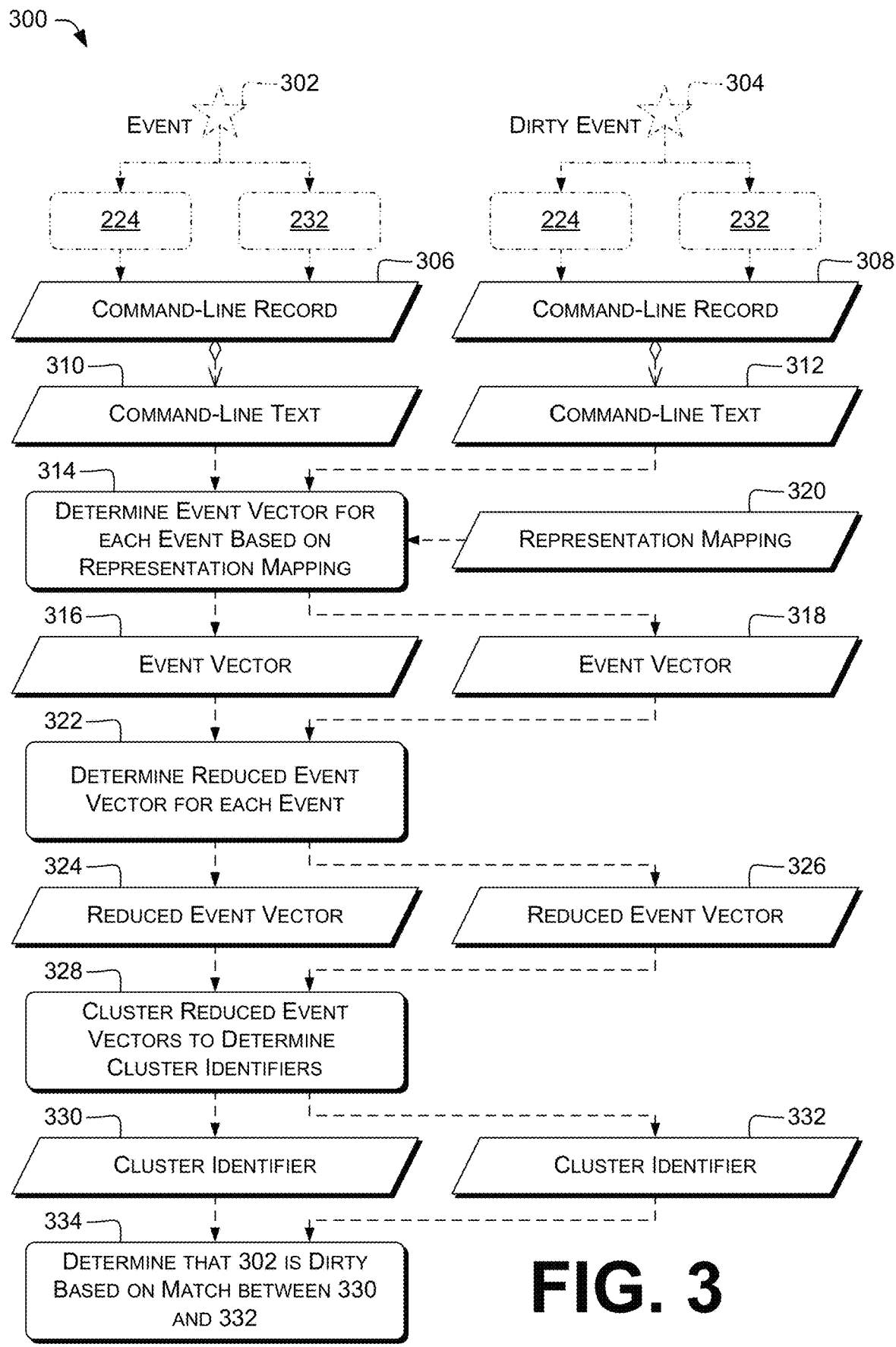
FIG. 3 is a dataflow diagram that illustrates example techniques for performing security analysis of events, e.g., to determine whether an event is associated with a security violation.

The classification training data can include duplicate data samples or not. In some examples, the classification training data includes at most one occurrence of any particular event 126, 302. In some examples, the classification training data includes at most one occurrence of any particular command-line text 310, 312 (FIG. 3). In some examples, the classification training data includes at most one occurrence of any particular (per-process) command line (e.g., command lines 508, FIG. 5). In some examples, the classification training data includes at most one occurrence of any particular command-line text for each monitored computing device 104 on which that command-line text was detected. Examples are discussed herein, e.g., with reference to FIG. 3.

In some examples, the classification training data includes, per label (e.g., per classification 116), at most one occurrence of any particular command-line text 310, 312, or of any particular (per-process) command line (e.g., per command line of the command lines 508). For example, the command line "whoami" may occur exactly twice in classification training data: a first time in association with a clean event 126, and a second time in association with a dirty event 126. In another example, the command-line text 310 may occur exactly twice in classification training data: a first time in association with a clean event 126, and a second time in association with a dirty event 126.

In some examples, the training module 226 can perform an unsupervised learning technique or routine in addition to or instead of a supervised learning technique or routine. For example, unsupervised learning can be used to train a sub-classifier, and a smaller amount of labeled data than would be required for full supervised learning can be used to train a model from sub-classifier results to an output 242 (discussed below).

The training module 226 can determine the trained CM 220 to output classifications 116 or other outputs 242, e.g., with at least a predetermined level of accuracy, for the classification training data. In some examples, the training module 226 can perform minibatch-based training, e.g., with randomly-selected minibatches of the classification training data. In some examples, the training module 226 can run at least one training epoch, then validate using a validation set. In some examples, the training module 226 can test performance of the CM 220 on the validation set during training to reduce the probability of overfitting. Even if the CM 220 is very accurate on the training data, the training module 226 may retrain or adjust the CM 220 if the CM 220 is not very accurate on the validation set.

In some examples, training operations, e.g., gradient-descent epochs, can be repeated as long as accuracy on the validation set is improving as training proceeds, and can terminate when accuracy on the validation set ceases to improve as training proceeds. This can permit detecting overfitting, e.g., when accuracy on the validation set ceases to improve. Avoiding overfitting can permit determining CMs that have a higher probability of successfully determining whether events are associated with security violations, even for command lines not represented in the training data ("unseen samples"). In some examples, the number of epochs can be between 100 and 300, or between 100 and 500.

In some examples, training operations described herein can be carried out on a schedule, e.g., weekly or monthly; on expiration of a predetermined validity period of CM(s) 220; or when an accuracy of CM(s) 220 has degraded to a predetermined threshold. The number of inputs, input sets, or operation units shown herein is not limiting; the number shown can be used, or more than the number shown can be used, for any input, input set, or operation unit, or any combination of those shown.

In some examples, the CMs 220 include decision trees or forests, or other types of CM described herein with reference to CM(s) 114. Training module 226 can train trees or forests via recursive partitioning, boosting, bagging, RANDOM FOREST or xgboost training, or other techniques for building decision trees based, e.g., on feature values in classification training data. In some examples of regression trees, each leaf can hold a numerical value, e.g., of +1 to indicate association with a security violation, or −1 to indicate lack of such an association. Other values can be used, e.g., zero and one. In some examples of classification trees, each leaf can include an output, e.g., a bit or other discrete value, indicating whether the corresponding term subset is considered by the corresponding decision tree to be clean or dirty.

Various examples operate on terms received in event records 240, e.g., command-line text 310, 312. Command lines can be divided into terms, e.g., as discussed herein with reference to operation 406. Some examples map the terms into an encoding, e.g., one-hot, for use in CMs 220. In some examples, the training module 226 sorts a term corpus by frequency to provide a sorted term corpus. The term corpus and the sorted term corpus can include at least some terms drawn from or occurring in document corpus(es) described herein with reference to operation 314. The frequency can include a frequency of occurrence in the term corpus, a term-frequency/inverse document frequency (TF-IDF) of the term with respect to a term corpus including multiple documents, or another measure of frequency. In some examples, no stopword processing or stemming is applied to the term corpus. The sorting can include rearranging data of the term corpus in memory 212 or CRM 214, adjusting links in a linked list or other data structure representing term corpus in memory, or recording frequency information without actually performing any data rearrangement.

The term corpus can include, e.g., terms extracted (e.g., per operation 406) from data collected by a security service system, e.g., data of benign- or malicious-process command-line text (e.g., command-line text 310). In some examples, the term corpus can include terms extracted from individual command lines, or from groups of command lines such as command-line text 310, 312.

In some examples, the training module 226 can replace the K≥2 lowest-frequency (e.g., least-commonly-occurring) terms in the sorted term corpus with an unknown-term indicator. The unknown-term indicator can be, e.g., a string that is not a valid term under the extraction rules defined by operation 406 or as otherwise discussed herein. In an example in which terms match qr{\w+|[^\w\s]+}, the unknown-term indicator can be the string "u t", which does not match that regular expression. Additionally or alternatively, in a system in which qr{\w} only matches ASCII characters, a Unicode or other non-ASCII character can be used in the unknown-term indicator. Using an unknown-term indicator for low-frequency terms can reduce or centralize noise that might otherwise be introduced while determining a term representation for a low-frequency term.

In the illustrated example, the operation module 228 can operate the CM 220 based at least in part on, e.g., at least one trial event record of the event record(s) 240, to provide an output 242. Output 242 can represent, e.g., classification 116 or another indication of whether an event is associated with a security violation.

In some examples in which the CM 220 includes a decision tree, the operation module 228 can perform successive tests for specific characteristics while traversing the decision tree. In some examples in which the CM 220 includes a decision forest, the operation module 228 can perform successive tests for specific characteristics while traversing each decision tree, and can provide a classification 116 or other output 242 indicating, e.g., the mode (most common) of the results of traversing the trees, or a summation of the individual decision values of each tree. In some examples of classification, each leaf can include respective weight values for one or more classes. The operation module 228 can sum the weights for each class over all the trees and pick the class with the highest total weight as classification 116 or another output 242. In some examples, the operation module 228 can apply a logistic or other squashing function, e.g., to each weight before summing or to the sums of the weights.

In some examples, the CMs 220 include NNs, e.g., DNNs. An NN can include a softmax, threshold, clipping, clamping, or other operation to output(s) from neuron outputs of the output layer or the last hidden layer, although this not required in some examples. In some NN examples, the operation module 228 can operate CM 220 at least partly by applying multiplication, summing, and activation functions to successive layers of the NN. Operation module 228 can provide the outputs of each layer, transformed based on edge weights, as inputs to the next layer.

Output 242 is shown as stored in CRM 214. Output 242 can additionally or alternatively be stored in memory 212 or another processor-accessible storage device, e.g., a transmit buffer of communications interface 236. In some examples, CM 220 can be configured to provide a classification 116 for any type of event. In other examples, CM 220 can be configured to provide a classification 116 for events known to be of a particular type. For example, separate CMs 220 can be determined and operated for malware-related events and for targeted-attack events.

In some examples, the training module 226 or the operation module 228 can operate the CM 220 based at least in part on training event record(s) 112 of a validation set to evaluate the performance of the CM 220. The CM 220, e.g., the representation mapping 222, can then be updated based on the evaluation. The dashed arrow from operation module 228 to training module 226 depicts coordination between those modules. Alternatively, the evaluation and updating can both be performed by the training module 226.

In some examples, the interface module 230 can present representations of event record(s) 240 or output(s) 242, e.g., via UI 202. Additionally or alternatively, interface module 230 can receive indications of tag(s) or other data, e.g., via UI 202. Interface module 230 can then associate events with those tag(s) or other data items, e.g., by updating event record(s) 240. Examples are discussed herein, e.g., with reference to FIGS. 9-14.

In some examples, the communications module 232 can provide an indication of the output 242, e.g., via the communications interface 236. For example, the indication can be transmitted to a computing device 104, e.g., via network(s) 108. Examples are discussed herein, e.g., with reference to at least FIG. 4-6, 8, 10, or 14. In some examples, communications module 232 can additionally or alternatively receive the executable file 218 (or another data stream) via the communications interface 236.

In the illustrated example, the mitigation module 234 can receive an indication that an event is associated with a security violation, or an indication of a mitigation action to take. The indication can be, e.g., output 242. The mitigation module 234 can then take action to reduce negative effects a dirty process, data stream, or other system component related to the event may cause. For example, the mitigation module 234 can terminate process(es), delete or quarantine file(s), or trigger a reboot. Additionally or alternatively, mitigation module 234 can take action to monitor a security violation in more detail (e.g., to collect stack traces or profiling data of a process) in order to permit more effectively reducing the negative effects of that security violation. In some examples, the mitigation module 234 can take a mitigation action (e.g., in response to security commands 424, FIG. 4) based at least in part on the monitored computing device 104. For example, a mitigation action on a honeypot computing device 104 can be to increase the detail of data collection, while a mitigation action on a home PC computing device 104 can be to kill malicious processes. This can permit cluster 106 to process data from both types of computing devices 104 using the same or similar techniques, which can increase processing speed and efficiency at cluster 106. In some examples, mitigation module 234 can be included in or associated with OS 216. For example, mitigation module 234 can run at ring zero (on x86 processors) or another high-privilege execution level.

Figure 4:
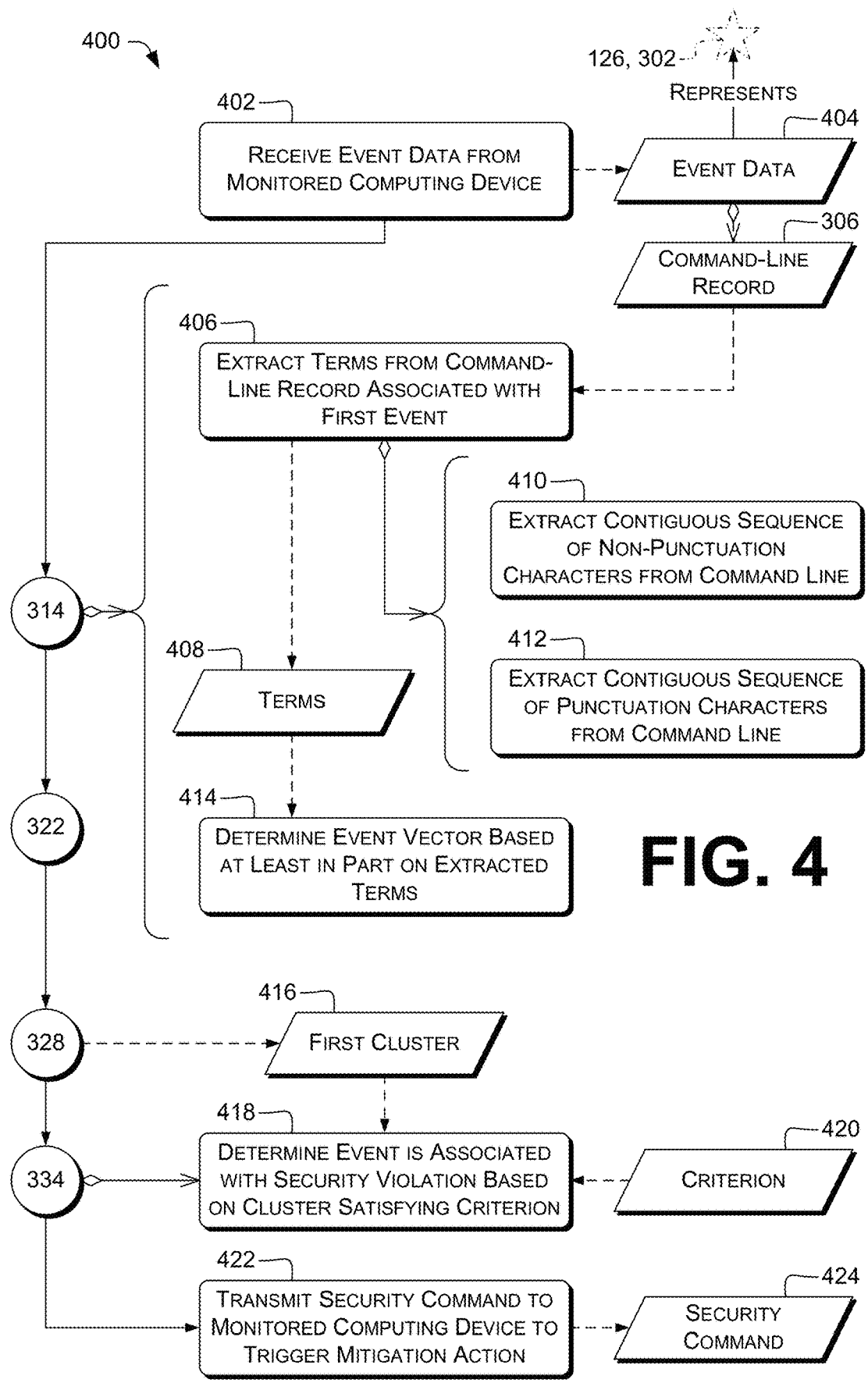
FIG. 4 is a dataflow diagram that illustrates example techniques for performing security analysis of events and interfacing between, e.g., a monitored computing device associated with the events and a security service.

In some examples, the mitigation module 234 can quarantine a file or other data stream (e.g., indicated in a security command 424, FIG. 4). The file or data stream can be, e.g., a data stream associated with a dirty event 126). For example, the mitigation module 234 can move, rename, archive, or encrypt, the data stream, or otherwise prevent the data stream from being, e.g., loaded or accessed. The mitigation module 234 can additionally or alternatively alter or remove settings, e.g., registry keys or/etc/inittab entries, to prevent OS 216 from loading the data stream. Additionally or alternatively, the mitigation module 234 can terminate a process, e.g., a process associated with a dirty event 126.

In some examples, the operation module 228, the communications module 232, or another module stored in CRM 214 can be configured to receive inputs, e.g., via user-operable input device 206 or from a filesystem, transmit corresponding queries to a computing device 102, receive responses from computing device 102, and present the responses, e.g., via display 204. Examples are discussed herein, e.g., with reference to FIGS. 9-14 (e.g., Web-browser interfaces using AJAX or COMET to transmit queries and receive responses). In some examples, the operation module 228, the communications module 232, or another module stored in CRM 214 (e.g., a module in communication with UI 202) can be configured to receive tags or other information, e.g., via UI 202, and to associate one or more event record(s) 240 with the tag. Examples are discussed herein, e.g., with reference to FIGS. 9-14. In some examples, a computing device 102 executes at least one of modules 226, 228, 230, and 232, and a computing device 104 executes at least one of modules 230, 232, and 234. In some examples, one or more computing device(s) execute module 226, and one or more different computing device(s) execute module 228.

In some examples, any of the above-noted modules can be configured to receive inputs and to determine or operate CM(s) 114 or perform other analyses using instructions of operation module 228 based at least in part on those inputs, e.g., to determine an output 242. In some examples, computer-executable instructions on CRM 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

In some examples, operation module 228 (or another module of computing device 200) includes a representation subsystem 244, a reduction subsystem 246, a clustering subsystem 248, and a security subsystem 250. In other examples, computing device 200 excludes one of, any number of, or all of, subsystems 244-250. In the illustrated example, subsystems 244-250 are shown as components of operation module 228. In some other examples, some functions of training module 226 or other modules described herein are included in at least one of subsystems 244-250.

In some examples, representation subsystem 244 can be configured to determine at least two term representations based at least in part on command-line text associated with an event, or to determine event vectors representing events, e.g., using the representation mapping 222. In some examples, reduction subsystem 246 can be configured to determine reduced event vectors having lower dimensionality. In some examples, clustering subsystem 248 can be configured to cluster event vectors or reduced event vectors to divide events into groups. In some examples, security subsystem 250 can be configured to determine whether an event is associated with a computer-security violation, and to provide indications or security commands, or perform tagging, in response.

In some examples, a computer-security system includes computing device(s) 200 representing computing device(s) 102 and other computing device(s) 200 representing monitored computing device(s) 104. Detection module 224 can be, include, or be part of a security agent executable on the monitored computing device and configured to send at least some of the event data via a network interface to a network interface of computing device(s) 102. In some examples, computing device(s) 102 can add data to an event or trigger additional event(s) based on the event data received from monitored computing device(s) 104.

In the illustrated example, detection module 224 (e.g., a security agent running on computing device 104) can detect events and provide corresponding event records 240. Additionally or alternatively, communications module 232 (e.g., running on a computing device 102) can receive event records 240 describing events. In some examples, communications module 232 can receive queries 122 for processing by operation module 228. Communications module 232 can provide to a computing device 118 or other query-originating device(s) the result record(s) 124, e.g., including or representing output(s) 242.

In some examples, event records 240, queries 122, result records 124, or other data described herein, can be transmitted, e.g., via HTTP requests transmitted over TCP connections. For example, an HTTP request conveying a record, e.g., in a body of the request, can also include a URL parameter, HTTP cookie, or other data carrying identifying information or credentials associated with the record. Result records 124 and other data herein can be carried in an HTTP response header or body, or other response to a request or unprompted transmission.

In some examples, detection module 224 can include a kernel-level security agent (e.g., part of OS 216, as shown) or a user-level security agent. In various embodiments, the kernel-level security agent can be installed on the host computing device in the form of a driver. For example, a driver or other implementation of detection module 224 can use hooks or filter drivers, or monitor memory or log files, as discussed below.

In some examples, the kernel-level security agent can operate on computing device 104 as a virtual machine/shadow OS. The kernel-level security agent can load before the OS 216 of the host computing device, e.g., very early in the boot-time of the host computing device, by some of the first few dozen instructions in some examples. Pre-boot components of detection module 224 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 224 can be received from or operable with a security service. Such a security service may be implemented as a cloud of security service devices, e.g., cluster 106, referred to herein as a "security service cloud" or a "remote security system." The security service cloud can, e.g., install the detection module 224 on the computing device 104; receive event records 240 or other notifications of observed events from the detection module 224; perform analysis of data associated with those events; perform, direct, or trigger mitigation actions at computing device(s) 104; or generate configuration updates and provide those updates to the detection module 224. These or other interactions between the kernel-level security agent and the security service cloud can enable a detection loop that defeats the malware update loop of adversaries, such as malware developers.

In some examples, detection module 224 can include various components, e.g., various software modules. Components can include collectors, filters, routers/dispatchers, or event consumers. Collectors can receive notifications of events (e.g., file writes and launching executables) from host OS hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record 240 including the forensic data.

In various embodiments, a collector may register with a hook or filter driver offered by the OS 216 to receive notifications of the occurrence or non-occurrence of certain events, such as file creates, reads, and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 224. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 224 may include user mode collectors to observe events that may not be visible to kernel mode processes. Such events could include, for example, rendering of display graphics for display on a display screen of the computing device 104. To observe these events, the detection module 224 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 224. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

In some examples, the detection module 224 (e.g., running at a monitored computing device 104 or in cluster 106) can build and maintain a model representing chains of execution activities and genealogies of processes. This model can be used to track attributes, behaviors, or patterns of processes executing on the computing device 104 and can enable an event consumer to determine when an event should be reported to the operation module 228 for evaluation. Upon determining an occurrence of such an event, the event consumer can perform any or all of: updating the situational model and performing further observation; generating an event record 240 to represent the determination that an event has occurred; notifying the security service cloud of the event (e.g., by transmitting event record 240 to the security service cloud, e.g., in cluster 106); or performing, directing, or triggering mitigation actions at computing device 104 (e.g., halting execution of a process associated with a security violation). In various embodiments, any or all of the observing, filtering, routing/dispatching, or utilizing of event consumers may occur in parallel with respect to multiple events.

In some examples that detect events based on chains of execution activities of the host computing device and other data described herein, rather than on fixed signatures, the kernel-level security agent is able to effectively detect processes associated with malicious code. While adversaries can easily change malware to avoid signature-based detection, it is significantly more difficult to avoid detection by an agent (e.g., detection module 224) that monitors and analyzes events. Cluster 106 (e.g., operation module 228 thereof) can process events from multiple computing devices 104 to detect more complex patterns of malicious activity.

Illustrative Techniques

FIG. 3 is a dataflow diagram that illustrates example techniques 300 for determining an indication of whether an event is associated with a security violation, e.g., by performing representation, dimensionality-reduction, and clustering operations, and related dataflow (shown dashed for clarity). Example functions shown in FIG. 3 and other flow diagrams and example techniques herein can be implemented on or otherwise embodied in one or more computing device(s) 102 or 104, e.g., a computing device 200, e.g., using software running on such device(s), e.g., software executed by processing unit(s) 210. Accordingly, the discussion of techniques 300, and discussions of techniques in FIGS. 4-14, contemplate performance of the techniques, systems configured to perform the techniques, or computer-readable media (e.g., computer storage media) comprising instructions executable by at least one processor to cause the at least one processor to perform the techniques.

For the sake of illustration, the example techniques 300 are described below with reference to processing unit 210 and other components shown in FIGS. 1 and 2 that can carry out or participate in the steps of the example techniques (e.g., a control unit), and with reference to data structures shown in FIGS. 1 and 2. However, other processing unit(s), such as processing unit(s) 210 or other components of computing device(s) 102 or 104, can carry out step(s) of described example techniques such as techniques 300. Similarly, example technique(s) shown in FIGS. 4-14 are also not limited to being carried out by any specifically-identified components.

The order in which the operations are described in each example flow diagram or technique is not intended to be construed as a limitation, and any number of the described operations can be combined in any order or in parallel to implement each technique. In each flow diagram, fewer than all of the depicted operations can be performed, except as expressly noted. Moreover, the operations in each of FIGS. 3-14 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions, e.g., sections of the hardware of an FPGA- or ASIC-based control unit.

Operations in FIGS. 3-14 can be performed by modules or subsystems described herein with reference to FIG. 2. Alternatively, the number or arrangement of modules or subsystems performing functions described herein may be different from that shown in FIG. 2. Accordingly, references to specific modules or subsystems performing operations described herein are for clarity, and also envision other modules or subsystems that may perform those operations.

For clarity of explanation, the operations of FIG. 3 are described in terms of batch processing. However, this is not limiting, and the operations of FIG. 3 (or FIGS. 4-14) can be performed in a streamed or pipelined manner, or any combination of batch, stream, and pipelined processing.

In some examples, detection module 224 running on a computing device 102 or 104 detects a plurality of events. Each event is associated with a monitored computing device 104. For brevity, only two events 302, 304 (can represent respective events 126) are shown. In some examples, event 302 is associated with a process that has an ancestor process, e.g., a parent, grandparent, &c. Detection module 224 can produce a plurality of event records 240 (FIG. 2) including event data describing the respective events 302, 304. Additionally or alternatively, communications module 232 can receive the event records 240. Each event record 240 can include a respective command-line record 306, 308 associated with the respective event 302, 304.

In some examples, an event record 240 can include data indicating an event type of the respective event 302, 304. Event types are described herein for clarity using natural language, but can be identified in at least some software or hardware implementations using enumerated values, abbreviated text strings (e.g., reverse domain names), or other forms. Nonlimiting example event types can include, e.g., "process created," "file opened," "network connection established," or "DNS request made." In some examples, events 302, 304 of these types are detected by computing device 104. Further nonlimiting example event types can include "grandchild process spawned," "signature match," or other event types of events 302, 304 detected based on information collected over time or supplemental information (e.g., an antivirus database) used in addition to sub-event data from computing device 104. In some examples, events 302, 304 of these event types are detected by computing device(s) 102.

In some examples, monitored computing device 104 sends event records 240 to cluster 106 representing process-launch sub-events. For example, an event record 240 representing a process-launch sub-event can include the command line of the launched process, a process ID (PID) of the launched process, and a process ID (PPID) of the parent of the launched process. Cluster 106 uses the PID and PPID to record relationships between processes. Cluster 106 can receive a process-launch sub-event and determine the number of processes in the chain beginning with the launched process and ending with the root process (e.g., init(8), the System process, PID 4, on a WINDOWS system, smss.exe, dwm.exe, wininit.exe, or winlogon.exe) running on the monitored computing device 104. If the number is ≥3 (e.g., a grandchild of the root process, or farther down) (or ≥k, for predetermined integer k>1), cluster 106 can trigger an event 302, 304 for processing as described herein. That event can have an event type of "process having parent and grandparent started" or similar.

Further example events 302, 304 can include or represent occurrences of at least one of the following, and can be indicated by corresponding event types.

Creating a process, for example, creating of a command line interface (CLI) process;

Creating a thread;

Creating a remote thread (i.e., creating a thread in another process), for example, dynamic-link library (DLL)

injection or other thread injection, which is an action that can be used to escape one process and pivot to another process;

Creating a new script (e.g., batch file, shell script, VISUAL BASIC script, or POWERSHELL script);

Creating a new executable (e.g., creating a portable executable (PE));

Accessing another process and reading from its memory or writing to its memory;

Creating a service (e.g., a service can be used to start a process or to start a process every time system is rebooted);

Modifying a service binary (e.g., changing portable executable files on disk instead of writing them);

Writing a dump file;

Decreasing security of a registration key or industry key;

A suspicious raw disk read; or

Privilege escalation in some contexts (e.g., user account control requests for elevation).

The "creation" events discussed above may be examples of events triggered while malware is dropping code on a monitored computing device. The actions discussed above may only trigger events when certain objects commit them. For example, when an Internet browser plug-in thread is compromised, activities such as CLI creation, process migration, installation, or PE creation and execution may be indicative of compromise of the Internet browser plug-in thread by a security violation. Moreover, an identity of an object that originated an action itself may determine whether or not an action taken by the monitored computing device triggers an event. For example, some plugins and processes are more susceptible to vulnerabilities and are therefore used for security violations more often. Actions taken by, or regarding, those plugins or processes may therefore trigger events.

Throughout this document, an event record 240, or any other record described herein, can include one or more fields, each of which can have a name or other identifier, and each of which can include or be associated with one or more values. For example, event record 240 or other records herein can be represented as ASN.1-defined data structures, GOOGLE protobufs, JSON records, XML documents or subtrees, associative arrays, or other forms of tagged or key-value storage. Examples of fields can include, but are not limited to, timestamps, filenames, filehandles, userids (e.g., Windows SIDs), groupids, process identifiers, session identifiers, process command lines, command-line histories, universally unique identifiers (UUIDs), operating-system identifiers, e.g., from uname(1), permissions, access-control lists (ACLs), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 224 (e.g., a version number), values from the registry, dotfiles, or other configuration data (e.g., crontab entries), call-stack entries, domain names (e.g., relative or fully-qualified, FQDN), names or other identifiers of mutexes, named pipes, or other inter-thread communication or inter-process communication (IPC) mechanisms, or counts (e.g., of VIRUSTOTAL dirty indications).

In some examples, field values associated with an event 302, 304 indicating an action taken or attempted by a process can report the corresponding values before the action, after the action, or both (e.g., filename before or after a rename, or both). In some examples, field values can include the results of applying transform(s) to any of the above, e.g., to smash case or otherwise filter or preprocess the data. In some examples, an event record 240 can include information about a process that is currently running on the computing device 104, or that has previously run on the computing device 104. In some examples, an event record 240 can include information about at least one currently-running process and at least one related process (e.g., still running or already terminated), e.g., a parent process of the currently-running process.

In some examples, at least one event type can be associated with an event 302, 304 that only occurs when a specific OS 216 is running on the computing device 104 (e.g., WINDOWS-only events or MAC OS X-only events). In some examples, at least one event type can be associated with events 302, 304 that occur on multiple operating systems 216 (e.g., events that can occur on any OS providing a POSIX-compliant API). In some examples, an event type can indicate at least one of the following types of events 302, 304: a user logging on or off, the detection module 224 starting up or shutting down, a process being created, a network name being looked up (e.g., via DNS), a network connection being initiated or established (e.g., IPv4 or IPv6), a value in an auto-start extensibility point (ASEP) being created or modified, an executable being created, modified, or deleted, a critical system file being modified, a file of a specific type or extension being created or updated (e.g., based on a database listing the specific type(s) or extension(s) to be monitored), a new scheduled task or daemon being registered or otherwise set up to execute at a future time or on a schedule, or a process making or attempting an access to a portion of a disk, memory, or other system resource not allocated to that process.

In some examples, detection module 224 provides, or communications module 232 receives, command-line text 310, 312 associated with the respective events 302, 304. In some examples, command-line text 310, 312 is included in the command-line record 306, 308 or other data associated with the event 302, 304. Command-line text 310, 312 can, for example, be included in a field in an event record 240. Each of command-line text 310, 312 can include at least one command line associated with the respective event 302, 304. Additionally or alternatively, each of command-line text 310, 312 can include at least two command lines associated with the respective event 302, 304. For example, the command-line text 310 can include a first command line associated with a first process, and a second command line associated with an ancestor (e.g., parent, grandparent, . . . ) process of the first process.

In some examples, the at least two command lines (in command-line text 310) associated with the event 302 can include command lines of first, second, and third processes. The first process can be a process that triggered the event 302. The second process can be a parent process of the first process. The third process can be a parent process of the second process. In some examples, the command-line text 310 comprises the concatenation of the first-, second-, and third-process command lines in a predetermined order (e.g., third-, then second-, then first-process, or vice versa, or any other order). For example, a remote-desktop host (third, grandparent process) may spawn a shell (second, parent process) (e.g., cmd, POWERSHELL, or sh), which in turn spawns a process (first process) selected by the user of remote-desktop services.

In the illustrated example, techniques 300 are used to determine whether event 302 is associated with a security violation. Event 304 ("dirty event") is an event associated with a security violation, e.g., an event that has already been analyzed using techniques 300 or other techniques, e.g., virus scanning, and determined to be associated with a security violation.

At 314, the representation subsystem 244 can determine a respective event vector 316, 318 for each event 302, 304 of the plurality of events. Each event vector 316, 318 can be determined based at least in part on at least a portion of (e.g., all of) the respective command-line record 306, 308. Each event vector 316, 318 can have a first number of elements, e.g., ≥100 or 300 elements. In some examples, each event vector 316, 318 can include x2vec (e.g., doc2vec) representations of command lines in the command-line text 310, 312, or of terms therein.

Operation 314 can include determining the event vectors 316, 318 based at least in part on a trained representation mapping 320, which can represent representation mapping 222. Representation mapping 320 can include an x2vec mapping. For example, a doc2vec model can be trained on a document corpus including representative command lines having representative terms (for example, qw{c:\/-\\<|>>> net find localhost}, among others), and the representation mapping 320 can be the fixed portion (e.g., weights after the hidden layer) of the parameters of the trained doc2vec model. In some examples, the corpus includes ≥10,000 terms (or ≥20,000, ≥30,000, ≥40,000, ≥50,000, ≥100,000, or ≥1,000,000). In some examples, the corpus includes command-line text 310 of both clean events and dirty events (e.g., event 304).

The representation mapping 320 can receive terms as input, e.g., in the form of text in the ASCII, CP437, UTF-8, or another encoding. The representation mapping 320 can include an internal lookup (e.g., a hash table or intern) to map from terms in the text to one-hot representations for input to doc2vec models or other representation models, such as RNN, autoencoder, or transformer models. In some examples, the internal lookup can map any term not included in the corpus to a predetermined "unknown-term" representation. Alternatively, the representation mapping 320 can receive encoded (e.g., one-hot) representations of terms. In some examples, the representation mapping 320 is or includes a lookup table (LUT), e.g., holding trained x2vec weights. In some examples, more than half of, >90% of, or all of, the data stored in trained representation mapping 320 is determined computationally rather than being determined directly by human mental activity.

The term "x2vec" is used herein for brevity to designate word2vec, doc2vec, and similar models. An x2vec model comprises a hidden layer and an output layer and is trained, e.g., by training module 226 in an unsupervised or substantially unsupervised manner, e.g., using stochastic gradient descent (SGD) or other gradient-descent techniques. The x2vec representation mapping 320 comprises at least some of the coefficients of the hidden layer or of portions of the model after the hidden layer. For example, in a skip-gram word2vec mapping, the model is trained to predict the probability that a pair of terms in a corpus will occur within a certain number of terms of each other. A word2vec-based x2vec representation mapping 320 comprises the coefficients of the hidden layer, and maps terms, e.g. in a one-hot encoding of the corpus, to term representations, e.g., vectors of numbers. In some examples of x2vec mapping 320, two terms have relatively more similar term representations if they occur together relatively more commonly than if they occur together relatively less commonly. In some examples, representation mapping 320 is trained or determined by training module 226.

A doc2vec (or "Paragraph Vector," PV, although not limited to paragraphs) model is trained to predict the probability that a term will occur in a particular document (e.g., each command-line text 310, 312 can be a document). The training is conducted to permit an entire document to be represented numerically. A distributed bag-of-words (PV-DBOW) model can be trained to map from one-hot document IDs to one-hot IDs of terms (e.g., words) in that document (e.g., paragraph, or command line or set of command lines in some examples herein). Alternatively, a distributed-memory (PV-DM) model can be trained to map from an input that is a combination of a one-hot document ID and one-hot term IDs of terms in that document, e.g., consecutive terms, to an output that is a one-hot term ID of another term in that document, e.g., the term after the consecutive terms. The input can be, e.g., the one-hot document ID appended to one-hot term IDs. The training can involve training the document ID alongside the terms of that document to determine relationships between document IDs and term IDs.

For both PV-DBOW and PV-DM, the outputs of the hidden layer of a trained doc2vec model include vectors (e.g., 300-element vectors) representing document. A vector can be determined for a document not found in the training set by locking (setting as read-only) the parameters (e.g., weights, biases, or coefficients) downstream of the hidden layer (e.g., weights between the hidden layer and an output layer) and retraining with the new document and its words. For PV-DM, the locked parameters include the trained word vectors. The hidden-layer outputs resulting from training with parameters locked (except for the document vector) form the vector for the new document.

In some examples using doc2vec, representation mapping 320 can include the locked parameters. Operation 314 can include determining event vector 316 by training the locked-parameter doc2vec model on command-line text 310, and likewise for event vector 318 from command-line text 312. Further details of examples of doc2vec are discussed herein with reference to paras. [0148]ff. Other techniques useful for determining CMs, e.g., doc2vec models or other representation mappings 222, 320 are discussed above with reference to CMs 220 and training module 226.

At 322, the reduction subsystem 246 can determine a respective reduced event vector 324, 326 for each of the respective event vectors 316, 318. Each reduced event vector can have a second number of elements smaller than the first number of elements, e.g., <100 elements, 3 elements, or 2 elements. Operation 322 can include determining the reduced event vectors 324, 326 at least partly by determining a t-Distributed Stochastic Neighbor Embedding (t-SNE), SNE, or other embedding of the event vectors 316, 318 in a space having a number of dimensions equal to the second number of elements. In some examples, operation 322 can reduce the dimensionality of data to be processed while retaining relationships between events in a lower-dimensional space (of the reduced event vectors 324, 326) that are similar to the relationships between those events in a higher-dimensional space (of event vectors 316, 318). Some examples use ≥1000 iterations of t-SNE. Further details of examples of t-SNE are discussed herein with reference to paras. [0148]ff.

At 328, the clustering subsystem 248 can cluster the reduced event vectors 324, 326 to determine a respective cluster identifier for each of the reduced event vectors 324, 326. For example, the clustering subsystem 248 can cluster the reduced event vectors using Density-Based Spatial Clustering of Applications with Noise (DBSCAN), Hierarchical DBSCAN (HDBSCAN), k-means, k-medoids, or other clustering algorithms or techniques. Operation 328 can be performed using density-based clustering techniques, in some examples. Event 302 can be associated with a first cluster identifier 330, and event 304 can be associated with a second cluster identifier 332. Further details of examples of HDBSCAN are discussed herein with reference to paras. [0148]ff.

At 334, the security subsystem 250 can determine that the first event 302 is associated with a security violation based at least in part on the first cluster identifier 330 matching the second cluster identifier 332, i.e., that first event 302 is in the same cluster as dirty second event 304. For example, security subsystem 250 can determine that any event clustered with a dirty event (e.g., event 304) is associated with a security violation.

In various illustrative examples, referring to FIG. 3 for context, without limitation, 300-element event vectors 316, 318 can be used. The representation mapping 320 can be a PV-DM doc2vec mapping. Representation mapping 320 can be trained periodically, e.g., daily, weekly, or monthly. The doc2vec representation mapping 320 can be initially trained (before locking the parameters) on a corpus including command-line texts 310, 312 for both dirty events and clean events. The corpus can additionally or alternatively include command-line texts 310, 312 for multiple events, each of which has a classification 116 selected from among N classifications, N>2. Representation mapping 320 can be trained using 5, 10, 15, 20, or another number of iterations. Representation mapping 320 can be trained on all the terms in a command-line text 310, 312, or on only the first T terms of each command-line text 310, 312, e.g., T=200, T=300, or T=400. In some examples, each command-line text 310, 312 includes multiple command lines, e.g., two, three, or more than three. In some of these examples, only the first T terms of each individual command line can be used. For example, up to 900 terms can be used from command-line text 310: up to 300 each for a first (e.g., grandparent-process), second (e.g., parent-process), and third (e.g., child-process) command line in command-line text 310. The number of terms used from each command line can differ, e.g., $T_1$ terms from a grandparent-process command line and $T_2 \neq T_1$ terms from a parent-process command line. In various illustrative examples, representation mapping 320 comprises an x2vec (e.g., doc2vec) mapping, operation 322 uses t-SNE, and operation 328 uses HDBSCAN. In some examples, the size of each event vector 316, 318 equals T, or is different from T (e.g., <T or >T).

In some examples, input data can be deduplicated before it is used for doc2vec training. For example, any particular command-line text 310, 312 can be included exactly once in the training data set. In some examples using command-line texts 310, 312 not classified as either clean or dirty ("unknown" classification), any particular command-line text 310, 312 can be included exactly once for each monitored computing device 104 on which it was detected.

In some examples, operation 322 can include using t-SNE. For datasets of <E events (e.g., E=400e3, 500e3, or 600e3), 2000 iterations can be used with perplexity 50. For datasets of ≥E events, 1500 iterations can be used with perplexity 1000. In some examples, operation 328 can include clustering using HDBSCAN with a minimum cluster size of five and a minimum sample count of five (or, likewise, 10 for each, or 15).

FIG. 4 is a dataflow diagram that illustrates example techniques 400 for analyzing events and interfacing between monitored computing devices 104 and cluster 106 (or another security service), and related dataflow (shown dashed for clarity). In some examples, techniques 400 can be performed by a control unit, as described herein, e.g., of a computing device 102. In some examples, operation 402 can be followed by operation 314; operation 314 can include operations 406 and 414 (or 406-414); operation 334 can include operation 418; or operation 334 can be followed by operation 422.

At 402, the communications module 232 can receive event data 404 from the monitored computing device 104 via a network 108. Event data 404 can represent an event 126, 302, e.g., detected at monitored computing device 104 (e.g., "process started") or indicating activity at monitored computing device 104 (e.g., "process having parent and grandparent started"). Event data 404 can include at least some of the command-line record 306 associated with event 302, e.g., at least some of command-line text 310. Event data 404 can be, include, or be a portion of an event record 112 associated with event 302.

At 406, the representation subsystem 244 can extract at least two terms 408 from the respective command-line record 306 associated with the first event 302. In some nonlimiting examples, operation 406 can include extracting the at least two terms 408 at least partly by performing at least one of, e.g., both of, operations 412 and 410. Some examples extract at least n terms, e.g., n=3, n=4, or n>4. Some examples "tokenize" the command-line text 310, e.g., determine the terms 408 or separate adjacent terms 408, using a tokenizer. Example tokenizers can include strtok(3), lex(1), or flex(1); one or more regular expressions; or a context-free or context-sensitive grammar (e.g., LL(k), LR(k), or LALR(k), k≥0).

Some examples include extracting, from a first command line of the at least two command lines in command-line text 310, 312, a contiguous sequence of punctuation characters as a first term of the at least two terms 408. Some examples further include extracting, from the first command line, a contiguous sequence of non-punctuation characters as a second term of the at least two terms 408. For example, the command line 'cmd.exe/c "echo No 31337"' can yield the terms qw{cmd.exe/c "echo 31337"}.

For example, at 410, the representation subsystem 244 can extract, from the first command line, a contiguous sequence of non-punctuation characters (e.g., qr{\w+}) as a first term of the at least two terms 408. In some examples, non-punctuation characters are those matching a predetermined regular expression (e.g., qr {[A-Za-z0-9]}, qr{\w}, or qr{[[:alnum:]]}).

At 412, the representation subsystem 244 can extract, from a first command line of the at least two command lines, a contiguous sequence of punctuation characters (e.g., qr{\W+}) as a second term of the at least two terms 408. In some examples, punctuation characters are those not matching the predetermined regular expression noted above with reference to operation 410. In some examples, a whitespace character (e.g., matching qr{\s} or qr{[[:space:]]}) is neither a punctuation character nor a non-punctuation character. In some examples, whitespace is disregarded except that it separates adjacent terms of the at least two terms 408. For example, terms can be sequences in the command-line text 310 matching qr{\w+|[^\w\s]+}.

In some examples, terms 408 are extracted from each command line of the at least two command lines separately, e.g., by mapping a regex sequentially against each command line rather than once against the concatenation of command lines. In this way, a grandparent command line ending " . . . oo" and a parent command line beginning "ps . . . " will not result in the term "oops" being included in the terms 408. Instead, the terms 408 in this example will include qw{-- oo ps}.

In some examples, the representation subsystem 244 can store terms 408 in order of occurrence in the command-line text 310, or can otherwise retain information about the relative order of the terms 408. This can permit analyzing behavior over sequences of command lines or individual operations, which can permit more effectively determining whether an event is associated with a security violation. For example, the UNIX shell command line "rm -- -rf *", when executed, will only remove files in the current directory (including one named "-rf"). However, "rm -rf *--" (the "--" double hyphen at the end) will remove files in the current directory and all subdirectories. Retaining term-order information permits distinguishing these command-lines from each other. Retaining term-order information also permits using prediction of following terms as the training task for PV-DM and similar x2vec models.

In some examples, stemming is performed on the command-line text 310 before or after extracting terms 408. In some examples, stemming is not performed on the command-line text 310 before or after extracting terms 408. In some examples, stopwords are not extracted as terms 408. In some examples, no stopword test is applied. In some examples, neither stemming nor stopword-detection is used while extracting terms 408.

In some examples, terms 408 are determined for at least one command line instead of or in addition to for at least two command lines. For example, terms 408 can be extracted from only the first-process command line, or from only the first-process command line and the second-process command line.

At 414, the representation subsystem 244 can determine the respective event vector 316 for the first event 302 based at least in part on the at least two respective terms 408. For example, the representation subsystem 244 can train a partially-locked doc2vec model to predict relationships between at least some of the terms 408 based at least in part on the event vector 316, e.g., as discussed herein with reference to operation 314. Additionally or alternatively, the representation subsystem 244 can retrain a new model (e.g., a doc2vec model), as discussed above, and extract the event vector from the retrained model. In some examples, successive training batches can use randomly-selected ones of the terms 408 in the training.

In some examples, operation 414 can include mapping the text of the terms to a one-hot or other encoding, e.g., using a term corpus such as that described herein with reference to training module 226. In some examples, the representation subsystem 244 can determine, for any extracted term not found in the representation mapping 320 or term corpus, or otherwise not mappable to an encoding, the term representation to be an unknown-term representation (denoted "𝕌" for clarity). This can reduce noise while retaining the spatial relationships between terms. For example, "ls -l" and "ls l" are very different in operation. If, hypothetically, "-" were not mappable to an encoding, using an unknown-term representation in its place would preserve the fact of the distinction, even if not the specific nature of the distinction (qw{ls 𝕌 l} vs. qw{ls l}).

In some examples, the plurality of events comprises a first cluster 416 of the events. Each event 302, 304 in the first cluster 416 is associated with the first cluster identifier 330.

For example, first cluster 416 can be determined based on the cluster identifiers output by operation 328. In some of these examples, operation 334 includes operation 418.

At 418, the security subsystem 250 can determine that the first event 302 is associated with a security violation further based at least in part on the first cluster 416 of the events satisfying at least one predetermined criterion 420. For example, criterion 420 can require, e.g., that at least one event 304, or that at least a predetermined nonzero percentage of the events 126 (e.g., 40%, 50%, or 70%), in first cluster 416 is dirty, or is associated with a specific type of security violation (e.g., malware or targeted activity). Additionally or alternatively, criterion 420 can require that first cluster 416 include a predetermined combination of events 126. The combination can include, e.g., ≥α% of events 126 associated with malware and ≥β% of events 126 associated with targeted activity (e.g., α=50, β=20; or α=25, β=25).

At 422, the communications module 232 can transmit a security command 424 to the monitored computing device 104 to cause the monitored computing device 104 to perform a mitigation action. Operation 422 can be performed in response to the determining at operation 334 that the first cluster identifier 330 matches the second cluster identifier 332, or to another determination that the event 302 is associated with a security violation.

In some examples, e.g., in response to receipt of the security command 424, the mitigation module 234 running at the monitored computing device 104 can perform mitigation actions. Examples of mitigation actions are described herein with reference to FIG. 2. Accordingly, in some examples, operations 402, 314-334, and 422 can be used together to automatically detect and mitigate malicious behavior at a monitored computing device 104.

In some examples, the security command 424 can request or direct a particular mitigation action. In at least one example, if first cluster 416 is associated with stored data (e.g., in cluster 106) indicating that more data is required or that first cluster 416 is a honeypot (e.g., if all or substantially all of the events in first cluster 416 are associated with honeypot computing devices 104), security command 424 can direct increased data monitoring and reporting at monitored computing devices 104 associated with events in first cluster 416; if not, security command 424 can direct killing of processes or quarantining of files at monitored computing devices 104 associated with events in first cluster 416.

Figure 5:
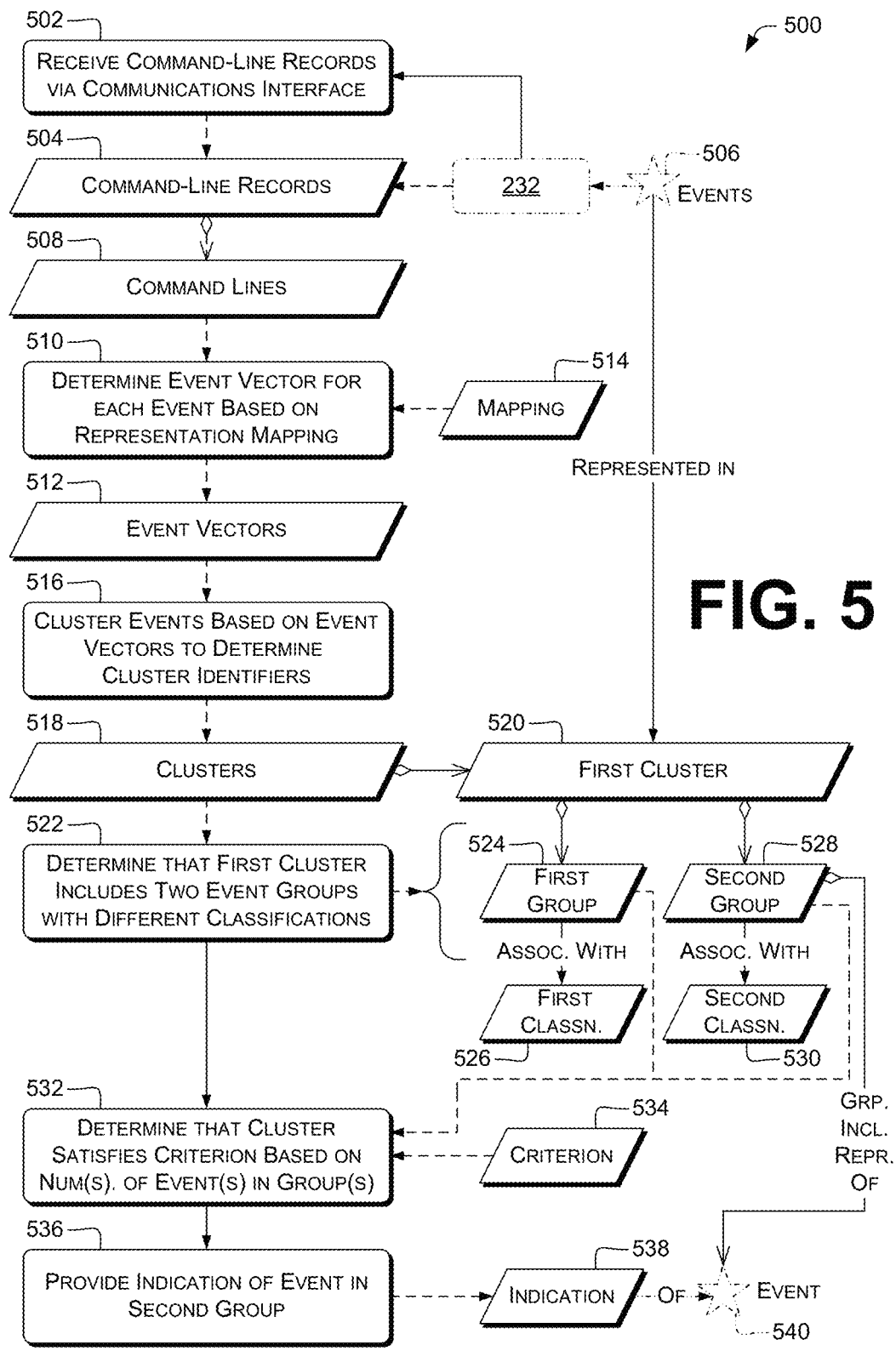
FIG. 5 is a dataflow diagram that illustrates example techniques for performing security analysis of events and detecting heterogeneous clusters of events.

FIG. 5 is a dataflow diagram that illustrates example techniques 500 for performing security analysis of events, and related dataflow (shown dashed for clarity). In some examples, techniques 500 can be performed by a control unit, as described herein, e.g., of a computing device 102.

At 502, the communications module 232 can receive, via a communications interface 236, a plurality of command-line records 504 associated with respective events 506 of a plurality of events. Command-line records 504 can represent command-line records 306, 308 or other command-line data carried in event records 112, 240 or other event data 404. Events 506 can represent events 126, 302, 304. Each of the command-line records 504 is associated with a corresponding monitored computing device 104 of a plurality of monitored computing devices 104. Each command-line record 504 can be associated with a respective, different computing device 104, or at least two command-line records 504 can be associated with a single computing device 104. The respective command-line record 504 for each event 506 can include at least two command lines 508 associated with that event 506. Examples are discussed herein, e.g., with reference to FIG. 1, communications interface 236, and operation 402.

At 510, the representation subsystem 244 can determine a plurality of event vectors 512 based at least in part on a trained representation mapping 514 (which can represent trained representation mapping 222, 320) and on respective command-line records 504 of the plurality of command-line records 504. Examples are discussed herein, e.g., with reference to operations 314 and 406-414.

At 516, the clustering subsystem 248 can cluster the events 506 (e.g., the representations of those events 506 in respective command-line records 504 or other event records 112) of the plurality of events 506 based at least in part on the plurality of event vectors 512 to assign each event 506 to a cluster of a plurality 518 of clusters. The plurality 518 of clusters can include a first cluster 520. Examples are discussed herein, e.g., with reference to operation 328.

At 522, the security subsystem 250 can determine that the first cluster 520 comprises at least a first group 524 of events 506 associated with a first classification 526 and a second group 528 of events 506 associated with a second, different classification 530, the second group 528 being smaller than (i.e., having fewer events 506 than) the first group 524. For example, the security subsystem 250 can divide the first cluster 520 by classification and select two of the resulting groups (e.g., the two largest, or the largest and the smallest) as the groups 524 and 528. Example divisions by classification can include, e.g., dirty vs. clean; malware vs. targeted; malware vs. clean; targeted vs. clean; classified vs. unclassified; or any particular classification (e.g., clean, dirty, malware, or targeted) vs. unclassified.

In some examples, the number of events in the first group 524 can exceed the number of events in the second group 528. In some examples, first group 524 includes all of, or at least half of, the events 506 in the first cluster 520 that are associated with the first classification 526. In some examples, second group 528 includes all of, or at least half of, the events 506 in the first cluster 520 that are associated with the second classification 530. In some examples, second group 528 includes exactly, or at most, one, two, five, ten, or twenty events.

At 532, the security subsystem 250 can determine that the first cluster 520 satisfies a predetermined criterion 534 based at least in part on at least: the number of events 506 in the first group 524 of events 506; or the number of events 506 in the second group 528 of events 506. The criterion 534 can require, e.g., predetermined numbers or percentages of events in groups 524, 528. For example, the criterion 534 can require that the first group 524 include >α% of the events 506 in first cluster 520 (e.g., α=50, 75, or 90). Additionally or alternatively, the criterion 534 can require that the second group 528 include <α% of the events 506 in first cluster 520.

In an example, α>50, the first group 524 includes dirty events 506, and the second group 528 includes events 506 not known to be either clean or dirty. The security subsystem 250 can determine that the events 506 in the second group 528 are dirty based on their membership in the first cluster 520, in which the majority of the events 506 are dirty. This can permit more readily detecting dirty events 506, without requiring further and possibly more time- or resource-consuming analysis. Additionally or alternatively, the security subsystem 250 can prioritize events 506 in the second group 528 for further analysis, e.g., by adding those events 506 to the front of a processing queue, to permit more rapidly responding to those events 506 if they are determined by that further analysis to be dirty.

In another example, α>50, the first group 524 includes dirty events 506, and the second group 528 includes events 506 determined to be clean. The security subsystem 250 can determine that the events 506 in the second group 528 should be re-evaluated based on their membership in the first cluster 520, in which the majority of the events 506 are dirty. This can reduce the occurrence of false misses. In some of these examples, β<50, or β<10.

In various examples, e.g., as discussed herein with reference to criterion 420, criterion 534 can require that first cluster 416 include a predetermined combination of events 126. The combination can include, e.g., ≥α% of events 126 associated with malware and ≥β% of events 126 associated with targeted activity (e.g., α=50, β=20; or α=25, β=25).

At 536, the interface module 230 or communications module 232 can, in response to the determining that the first cluster 520 satisfies the predetermined criterion 534, provide an indication 538, via the communications interface 236, of a first event 540. First event 540 can be an event 506 included in (e.g., represented by data clustered in) the second group 528 of events 506. Indication 540 can represent at least a portion of classification 116, result record 124, output 242, or security command 424. In some examples, operation 536 can include transmitting data via the communications interface 236 to cause updating ("tagging") of event record(s) 112 associated with first event 540, e.g., to include a tag or other data of the indication 538.

Additionally or alternatively, at operation 536, the interface module 230 can present a visual indication 538 of the first event 540 via display 204, or the communications module 232 can transmit the indication 538 representing first event 540 via network 108. In some examples, the indication 538 includes a code interpretable by a Web browser (e.g., HTML, JAVASCRIPT, CSS, or WebGL code) to present a visual representation of first event 540 via the Web browser. In some examples, the indication 538 includes data (e.g., a coordinate vector, discussed below with reference to FIGS. 9-14) usable by a program running in a Web browser to present a visual representation of first event 540.

Some examples permit correlating activity across multiple monitored computing devices 104. For example, the plurality of command-line records 504 can include a first command-line record associated with a first monitored computing device 104 (e.g., 104(1)) of the plurality of monitored computing devices 104, and a second command-line record associated with a second, different monitored computing device 104 (e.g., 104(2)) of the plurality of monitored computing devices 104. Clustering and analyzing events 506 occurring at multiple computing devices 104 can permit detecting large-scale breaches or other contemporaneous attacks on multiple computing devices 104.

Figure 6:
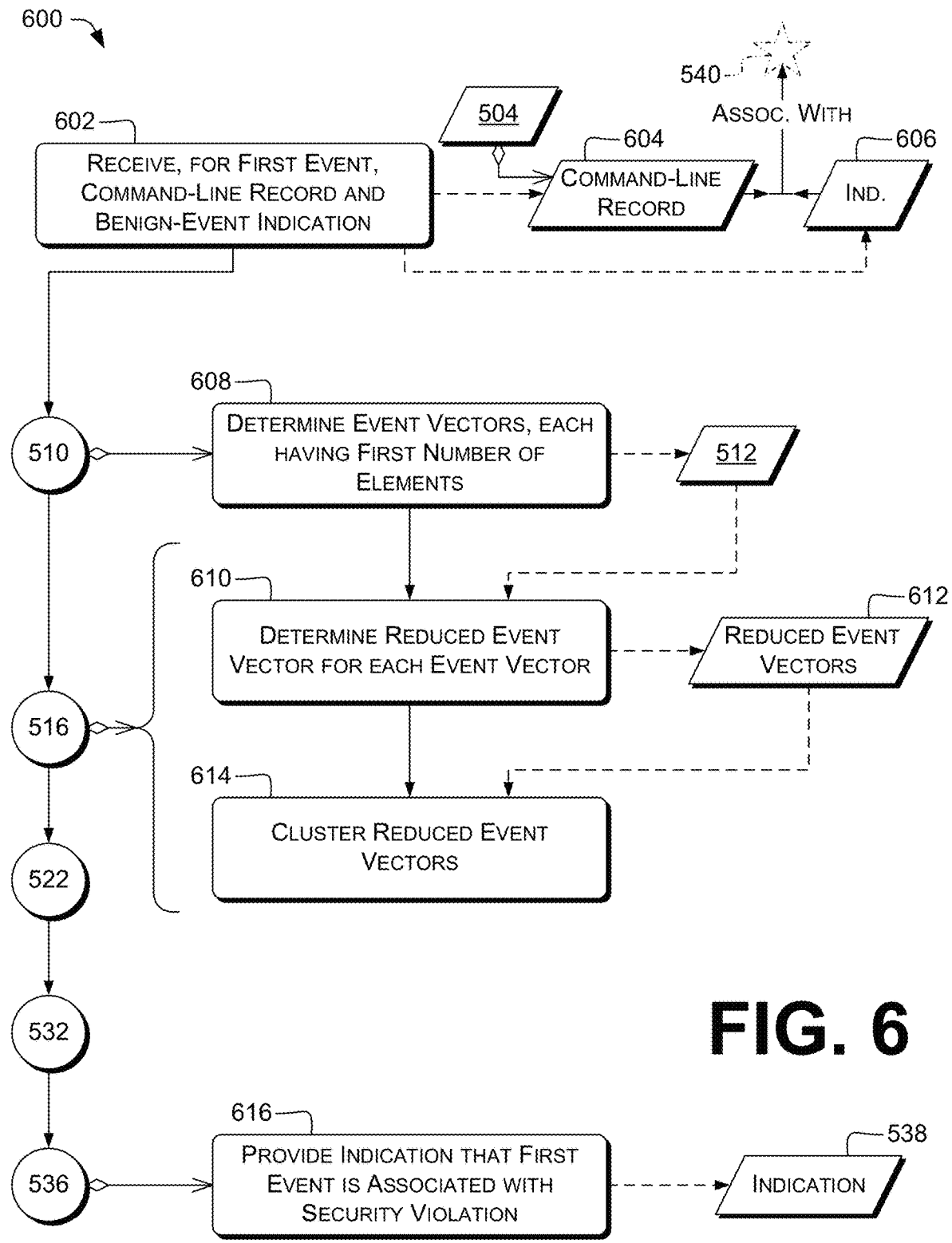
FIG. 6 is a dataflow diagram that illustrates example techniques for performing security analysis of events and interfacing between, e.g., a monitored computing device associated with the events and a security service.

FIG. 6 is a dataflow diagram that illustrates example techniques 600 for analyzing events and interfacing between monitored computing devices 104 and cluster 106 (or another security service), and related dataflow (shown dashed for clarity). In some examples, techniques 600 can be performed by a control unit, as described herein, e.g., of a computing device 102. In some examples, operation 602 can precede operation 510; operation 510 can include operation 608; operation 516 can include or be preceded by operation 610; operation 516 can include operation 614; or operation 536 can include operation 616.

At 602, the communication module 232 can receive, via the communications interface 236, a first command-line record 604 of the plurality of command-line records 504.

The first command-line record 604 can be associated with the first event 540. The communication module 232 can also receive an indication 606 that the first event 540 is clean or otherwise benign.

At 608, the representation subsystem 244 can determine each event vector 512 having a first number of elements. Examples are discussed herein, e.g., with reference to FIGS. 3-5. For example, the first number of elements can be 300.

At 610, the representation subsystem 244 can determine a respective reduced event vector 612 for each of the event vectors 512. Each reduced event vector 612 can have a second number of elements, and the second number of elements can be smaller than the first number of elements. Examples are discussed herein, e.g., with reference to operation 322 and reduced event vectors 324, 326. For example, operation 610 can include determining the reduced event vectors 612 at least partly by determining a t-SNE embedding of the event vectors 512 in a space having a number of dimensions equal to the second number of elements.

At 614, the clustering subsystem 248 can cluster the reduced event vectors 612 to assign each reduced event vector 612, and its respective event 506, to a corresponding cluster of the plurality 518 of clusters. Examples are discussed herein, e.g., with reference to operation 328. For example, operation 614 can include clustering the reduced event vectors 612 using HDBSCAN.

In some examples using operation 602, indication 606 marks first event 540 as clean. However, operations 510-532 may result in an indication that first event 540 is dirty. For example, first event 540 may cluster together with a large group of dirty events 506 in first cluster 520. This can indicate that indication 606 may be a false miss. Accordingly, in these and some other examples, operation 536 can include operation 616.

At 616, the interface module 230 or communications module 232 can provide the indication 538 that the first event 540 is associated with a security violation (dirty). Examples are discussed herein, e.g., with reference to classification 116, result record(s) 124, output 242, operation 422, security command 424, operation 536, or indication 538. Operations 602 and 616 can permit detecting and reporting false misses, which can increase the robustness of security solutions using these operations.

Figure 7:
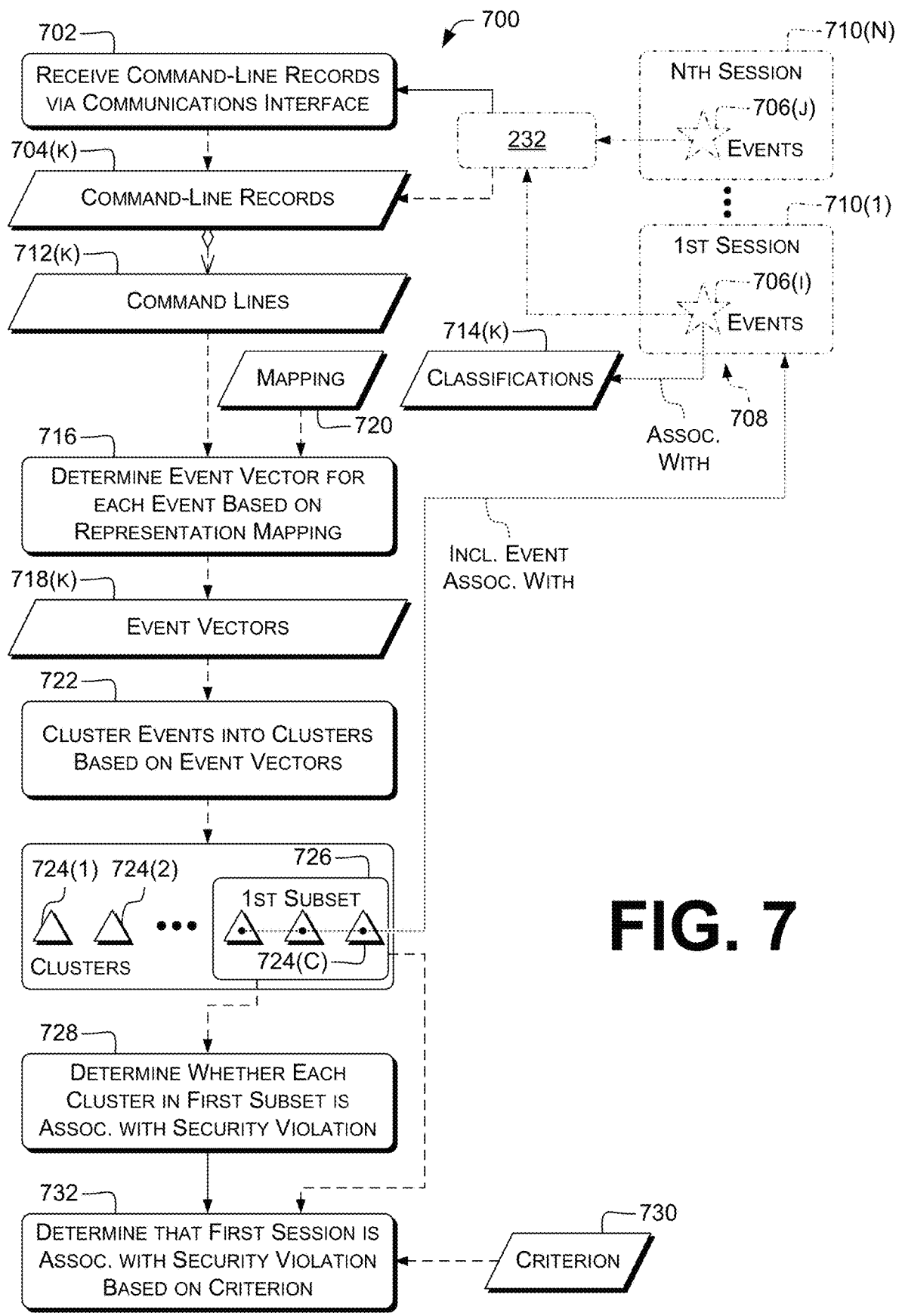
FIG. 7 is a dataflow diagram that illustrates example techniques for performing security analysis of events and session(s) at a monitored computing device associated with the events.

FIG. 7 is a dataflow diagram that illustrates example techniques 700 for performing security analyses of sessions based on events associated with those sessions, and related dataflow (shown dashed for clarity). In some examples, techniques 700 can be performed by a control unit, as described herein, e.g., of a computing device 102.

At 702, the communications module 232 can receive, via a communications interface 236, a plurality of command-line records 704 (which can represent command-line records 504). Each command-line record 704 can represent a respective event 706 (which can represent event 126, 302, 304, or 506) of a plurality 708 of events. Examples are discussed herein, e.g., with reference to operations 402 and 502.

Each event 706 of the plurality 708 of events can be associated with a corresponding monitored computing device 104. Each event 706 can also be associated with a corresponding session 710 at the corresponding monitored computing device 104. Shown are N sessions 710(1)-710(N) (individually or collectively referred to with reference 710), N≥1. In the illustrated example, events 706($i$), $1 \leq i \leq I$, are part of session 710(1), for some I≥1, and events 706($j$), $M \leq j \leq M+J-1$, are part of session 710(N), for some M≥I and J≥1. Events are individually or collectively referred to with reference 706. For brevity, the subscript "(k)" throughout the discussion of FIGS. 7-14 refers to data associated with event 706($k$), $1 \leq k \leq M+J-1$ (or other bounds appropriate to the particular figure being discussed).

A session can include a local or remote login session, e.g., a login at a physical console of monitored computing device 104 or a login via RDP, XENDESKTOP, or other virtualization or remote-login tools. A session is associated with at least one process running on computing device 104, generally a user's text or graphical shell (e.g., bash or WINDOWS Explorer). Processes launched by that shell are also generally associated with the session (although system services or daemons may not always be).

In some examples, a session includes at least one daemon or other process that was spawned by a process in the session and later invoked setsid(2) or another routine to create a new OS session. For example, a first session 710(1) can include a non-daemon process and a daemon (or system-service) process. The non-daemon process can be the process that spawned the daemon process.

In some examples, a session is identified by a (device ID, device-specific session ID) tuple. The device ID can be a unique identifier of computing device 104, e.g., a machine GUID or a hash of details of computing device 104. The device-specific session ID can be a unique identifier associated with the shell or other process that is the session leader (e.g., the first process launched within a session, or a process that called setsid(2) to become a session leader) or that created the session (e.g., the PID of a getty(8), login(1), or other system process that started the new session). In some examples, the device-specific session ID is unique among sessions on a particular computing device 104, but may not be unique across computing devices 104. In some other examples, the device-specific session ID is unique across computing devices 104. In some of these latter examples, a session is identified exclusively by a device-specific session ID. In some examples, the device-specific session ID is determine based at least in part on a timestamp (e.g., of session creation), e.g., by seeding a pseudorandom number generator (PRNG) using the timestamp or by including the timestamp as part of the input to a hash function that outputs a device-specific session ID.

In some examples, a session is identified by a (device ID, account ID, device/user-specific session ID) tuple. The device ID can be as described above. The account ID can be, e.g., a WINDOWS security identifier (SID), a numeric user ID, an X.500 or other globally-unique identifier of the user, a hash of any of those, or another identifier of the user whose credentials were used to log in and establish the session. The device/user-specific session ID can be, e.g., a locally unique identifier (LUID) that is assigned to the particular session that the access token represents. In some examples, the device/user-specific session ID can distinguish among sessions by a particular user at a particular computing device 104, e.g., sessions at different times, or concurrent sessions. In some examples, multiple device/user-specific session IDs can represent a single session, and techniques 700 can include maintaining and using a LUT to correlate the device/user-specific session IDs for a particular session with each other.

Each event 706($k$) of the plurality of events can be associated with a respective command-line record 704($k$). The respective command-line record 704($k$) for each event 706($k$) can include at least two command lines 712($k$) associated with that event 706($k$). For example, each event 706($k$) can be associated with a respective process that has a respective ancestor process. Each command-line record 704($k$) can include a respective first command line (of command lines 712(k)) associated with the process and a respective second command line (of command lines 712(k)) associated with the ancestor process. Examples are discussed herein, e.g., with reference to command-line records 306, 308, 504, command-line text 310, 312, and command lines 508.

In some examples, each event 706(k) is associated with a respective classification 714(k) (individually or collectively referred to with reference 714) (e.g., "unknown," "dirty," "clean", "dirty.malware," or "dirty.targeted"). Classifications 714 can represent classification 116. In some examples, classifications 714 can be received by communications module 232 as part of event records 112, 240 or other event data 404, or can be retrieved from a database. In some examples, the events 706 can all be associated with a single monitored computing device 104, or at least two of the events 706 can be associated with respective, different monitored computing devices 104.

In some examples, each command-line record 704(k) can include an identifier (e.g., hostname, network address, serial number, or other unique ID) of the corresponding monitored computing device 104, and an identifier (e.g., GUID or other session ID described above) of the corresponding session 710. In some examples, the identifier of the corresponding session 710 is unique among sessions 710 by a particular user on that particular monitored computing device 104, among sessions 710 on that particular monitored computing device 104, or across computing devices 104.

At 716, the representation subsystem 244 can determine a plurality of event vectors 718(k) (e.g., one per event 706(k)) using a stored representation mapping 720 (which can represent trained representation mapping 222, 320, 514) and based at least in part on respective command-line records 704(k) of the plurality of command-line records. Examples are discussed herein, e.g., with reference to operations 314, 406-414, and 510, and event vectors 316, 318, 512. For example, each event 706(k) can be associated with a respective event vector 718(k). Each event vector 718(k) can have a first number of elements, in some examples (e.g., as discussed herein with reference to operation 608).

At 722, the clustering subsystem 248 can cluster the events 706 of the plurality of events based at least in part on the plurality of event vectors 718 to assign each event 706(k) to a cluster 724(c) of a plurality of clusters, $1 \leq c \leq C$ (graphically represented as triangles). The plurality of clusters can include a first subset 726 (proper subset or otherwise) of the clusters 724, e.g., clusters 724(d) for $D \leq d \leq C$, $D \geq 1$ (in the illustrated example, D=C−2). Each cluster 724(d) of the first subset 726 can include (e.g., include data of, or otherwise represent) at least one event 706(i) that is associated with first session 710(1). The at least one event 706(i) in each of the clusters 724(d) can be events 706 of the plurality of events.

At 728, the security subsystem 250 can determine, for each (or, in some examples, at least one) cluster 724(d) in the first subset 726 of the plurality of clusters, whether that cluster 724(d) is associated with a security violation. The security subsystem 250 can make this determination based at least in part on at least some of the classifications 714(k) of the events 706(k) included in (e.g., represented by event vectors 718(k) clustered into) that cluster 724(d). For example, the security subsystem 250 can determine that a cluster 724(d) is dirty if at least a predetermined percentage (e.g., 40%, 50%, or 70%) of the events 706(k) in that cluster 724(d) are dirty.

Operation 728 can include using any of the techniques described herein (e.g., with reference to FIGS. 2-6) for determining whether a cluster is dirty. In some examples, operation 728 can include determining that a first cluster 724(d) of the plurality of clusters is associated with a security violation based at least in part on the respective classifications 714(i) of at least some of the events 706(i) in the first cluster 724(d) satisfying a second predetermined criterion (e.g., criterion 420 or 534) different from a predetermined criterion 730, discussed below.

At 732, the security subsystem 250 can determine that the first session 710(1) is associated with a security violation based at least in part on the first subset 726 of the plurality of clusters satisfying the predetermined criterion 730. For example, criterion 730 can require that at least a predetermined percentage (e.g., 40%, 50%, or 70%) of the clusters 724(d) in the first subset 726 be dirty.

In various examples, techniques 700 permit determining that a session 710(1) is dirty based on clustered events 706(i). This can permit locating a dirty session 710(1) without requiring analysis of all collected events of plurality 708, which can reduce the time and resource requirements of security analysis of session 710(1).

In a nonlimiting example, the predetermined criterion 730 is satisfied by at least a predetermined percentage (e.g., $\geq 30\%$, $\geq 40\%$, $\geq 50\%$, or $\geq 70\%$) of the clusters 724(d) in the first subset 726 of the plurality of clusters being associated with a security violation. In some examples, the second predetermined criterion is satisfied by at least a second predetermined percentage (e.g., $\geq 30\%$, $\geq 40\%$, $\geq 50\%$, or $\geq 70\%$) of the events 706(i) in the first cluster 724(d) being associated with a security violation.

In some examples, the overall balance of events across clusters in the first session 710(1) can be tested. For example, security subsystem 250 can determine that session 710(1) is dirty if at least a predetermined percentage (e.g., $\geq 30\%$, $\geq 40\%$, $\geq 50\%$, or $\geq 70\%$) of the events 706(i) in the first session 710(1) are dirty.

In some examples, the clustering subsystem 248 or the security subsystem 250 can identify or determine, at or before operation 728, the first subset 726 of the plurality of clusters 724. For example, the first subset 726 can be determine to include every cluster having at least one event associated with first session 710(1), or at least n events, n>1, or at least a predetermined percentage (e.g., >40%, >50%, or 100%) of the events in the cluster under consideration.

Figure 8:
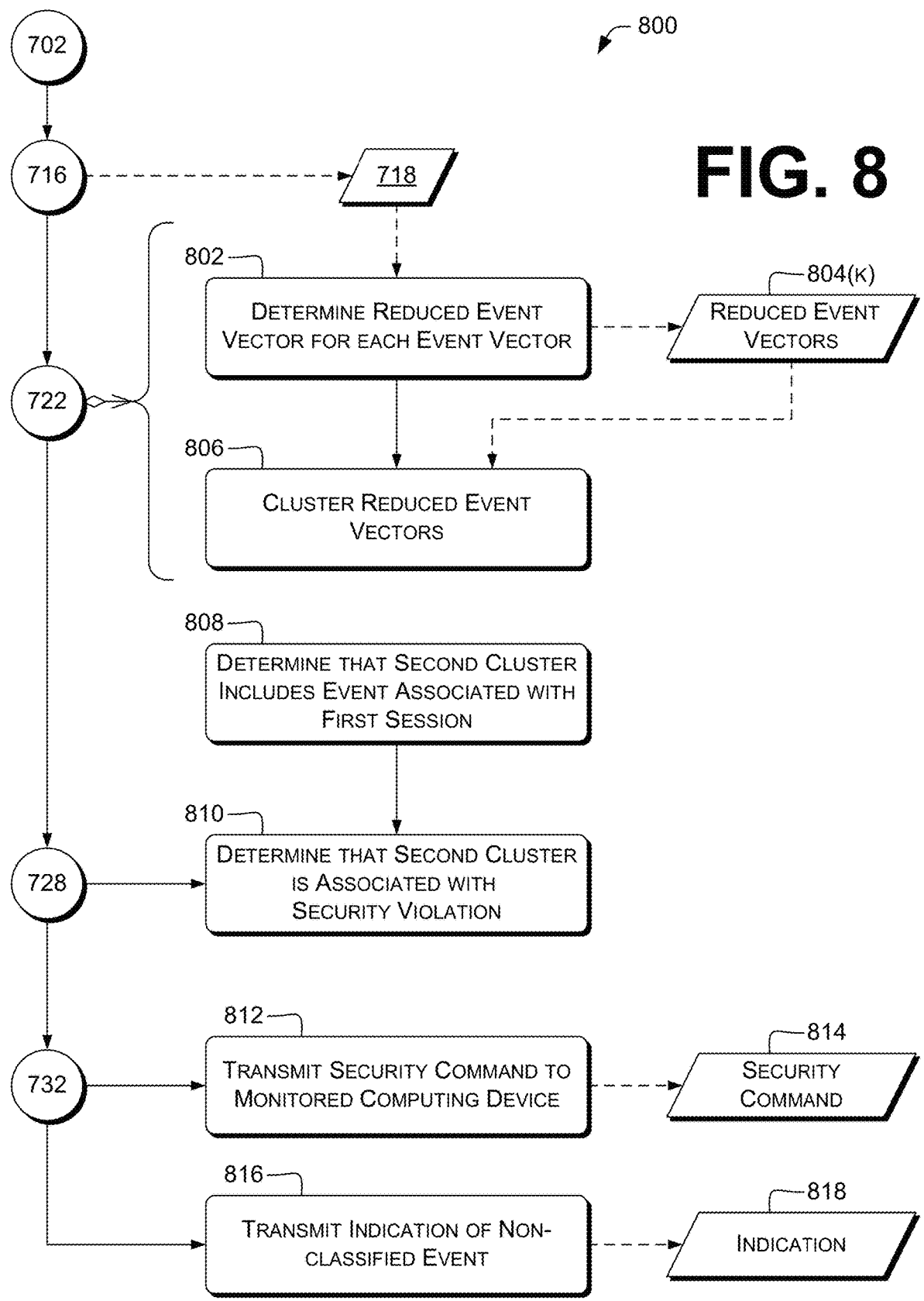
FIG. 8 is a dataflow diagram that illustrates example techniques for performing security analysis of events and interfacing between, e.g., a monitored computing device associated with the events and a security service.

FIG. 8 is a dataflow diagram that illustrates example techniques 800 for analyzing events or sessions and interfacing between monitored computing devices 104 and cluster 106 (or another security service), and related dataflow (shown dashed for clarity). In some examples, techniques 800 can be performed by a control unit, as described herein, e.g., of a computing device 102. In some examples, operation 722 can include or be preceded by operation 802; operation 722 can include operation 806; operation 728 can be followed by operation 810; operation 808 can precede operation 810; operation 732 can be followed by operation 812; or operation 732 can be followed by operation 816.

At 802, the representation subsystem 244 can determine respective reduced event vectors 804(k) for each of the plurality of event vectors 718(k). Each of the reduced event vectors 804(k) can have a second number of elements less than the first number of elements. Operation 802 can include determining a t-Distributed Stochastic Neighbor Embedding (t-SNE) or other embedding of the event vectors 718 in a space having a number of dimensions equal to the second number of elements. Examples are discussed herein, e.g., with reference to operations 322, 610 and reduced event vectors 324, 326, 612.

At 806, the clustering subsystem 248 can cluster the events 706(k) at least partly by clustering the reduced event vectors 804(k) using HDBSCAN or another clustering technique. Examples are discussed herein, e.g., with reference to operations 328, 614.

In some examples, a determination that a session 710 is dirty can permit determining that one or more (e.g., all) clusters 724(c) associated with that session 710 are dirty. Some of these examples use operations 808 and 810.

At 808, the security subsystem 250 can determine that a second cluster 724(2) of the plurality of clusters includes an event 706 associated with the first session 710(1). The first subset 726 of the plurality of clusters can exclude the second cluster 724(2). For example, the first subset 726 may not include every cluster 724(c) that contains an event from first session 710(1). Additionally or alternatively, operation 808 may be performed at a time later than the determination of first subset 726. Additional data of events of plurality 708 associated with first session 710(1) may have become available between a time at which first subset 726 was determined and a time at which operation 808 is performed (e.g., data of events 706(l), l>M+J−1, that occurred after the time of determination of first subset 726). Those events may be clustered into second cluster 724(2) or other clusters not included in first subset 726.

At 810, security subsystem 250 can determine that the second cluster 724(2) is associated with a security violation. This determination can be made in response to the determining at operation 728 that the first session 710(1) is associated with a security violation and to the determining at operation 808 that the second cluster 724(2) of the plurality of clusters includes an event 706 associated with the first session 710(1). The determination at operation 810 can permit readily classifying new events 706 or clusters 724 associated with a dirty session, which can in turn permit responding more quickly to targeted activity or other threats.

At 812, communications module 232 can transmit a security command 814 to the monitored computing device 104 that is associated with the first session 710(1) to cause the monitored computing device 104 to perform a mitigation action. Examples are discussed herein, e.g., with reference to classification 116, result record(s) 124, mitigation module 234, output 242, operation 422, security command 424, operation 536, indication 538, or operation 616. Operation 812 can be performed, e.g., in response to the determination at operation 732 that the first session 710(1) is associated with a security violation.

At 816, communications module 232 can transmit an indication 818 of a non-classified event 706(k) in first session 710(1). The non-classified event 706(k) can be an event that has not yet been assigned to a classification 116 of "clean" or "dirty" (e.g., has no classification 116, or has a classification 116 of "unknown"). Examples are discussed herein, e.g., with reference to operation 536. This can cause non-classified event 706(k) to be added to the front of an analysis queue, or otherwise prioritized for analysis. This can, in turn, reduce the time required to detect and respond to targeted activity.

Figure 9:
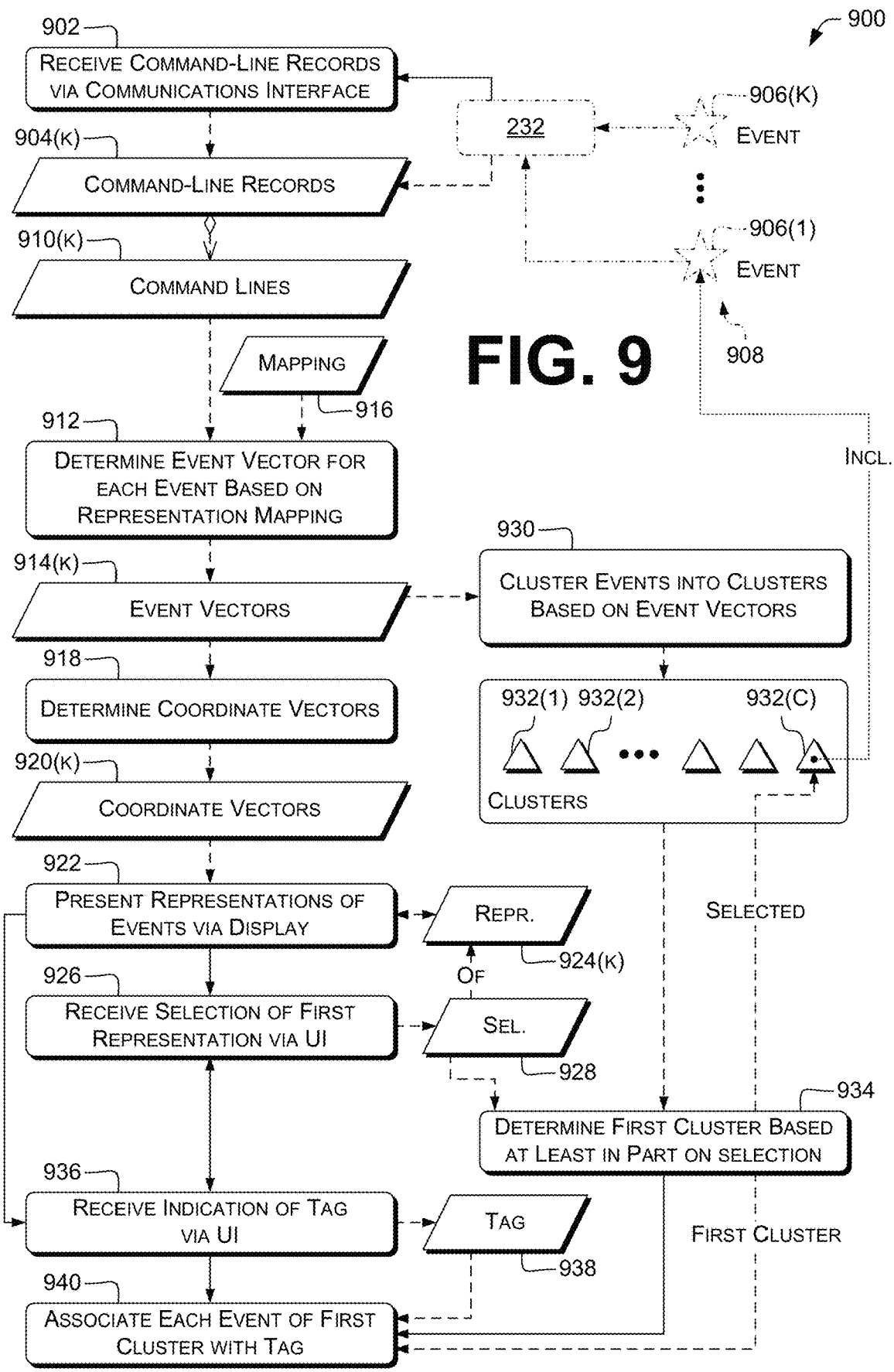
FIG. 9 is a dataflow diagram that illustrates example techniques for performing security analysis of events and providing access via a user interface to tags on those events.

FIG. 9 is a dataflow diagram that illustrates example techniques 900 for performing security analyses of events and providing access via a user interface to those events, and related dataflow (shown dashed for clarity). In some examples, techniques 900 can be performed by a control unit, as described herein, e.g., of a computing device 102.

At 902, the communications module 232 can receive, via a communications interface 236, a plurality of command-line records 904 associated with respective events 906(1)-906(K) (individually or collectively referred to with reference 906) of a plurality 908 of events. Each of the command-line records 904 is associated with a corresponding monitored computing device 104 of a plurality of monitored computing devices 104. The respective command-line record 904(k) for each event 906(k) comprises at least two command lines 910(k) associated with that event. The notation "(k)" is as used in FIG. 7. Examples are discussed herein, e.g., with reference to operations 402, 502, and 702, command-line records 306, 308, 504, and 704, events 706 of plurality 708 of events, command-line text 310, 312, and command lines 508, 712.

At 912, the representation subsystem 244 can determine a plurality of event vectors 914 based at least in part on a trained representation mapping 916 (e.g., an x2vec mapping) and on respective command-line records 904 of the plurality of command-line records. Each event vector 914 can have a first number of elements. Examples are discussed herein, e.g., with reference to operations 314, 406-414, 510, 608, and 716, and event vectors 316, 318, 512, 718.

At 918, the reduction subsystem 246, the clustering subsystem 248, or another component of operation module 228, or the interface module 230, can determine, for each of the plurality of event vectors 914, a respective coordinate vector 920 having a second number of elements smaller than the first number of elements. Operation 918 can include one or more reduction (e.g., t-SNE), clustering (e.g., HDBSCAN), or projection (e.g., 3D→2D) operations, in any order. In some examples, projection can be performed using model-view-projection matrices determined, e.g., by the position of a virtual camera in a virtual 3D space. The camera position, orientation (e.g., up, right, or look-at vectors), or field of view can be determined in response to user inputs, e.g., via an interface implemented using WebGL, OPENGL, or other graphics APIs. In some examples, the coordinate vectors 920 represent reduced event vectors 324, 326, 612, or 804(k). Examples are discussed herein, e.g., with reference to operations 322, 610, or 802.

At 922, the interface module 230 or communications module 232 can present, via an electronic display 204, respective representations 924 of at least some events 906 of the plurality of events at (e.g., at display coordinates determined based at least in part on) the respective coordinate vectors 920. In some examples, operation 922 can include determining the representations 924 (e.g., determining a color, shape, or size of a representation 924, e.g., based on its coordinate vector 920). In some examples, operation 922 can include receiving the representations 924 (e.g., sprites, billboards, or other artwork) and presenting them at display positions determined by the coordinate vectors 920. In some examples, operation 922 can include receiving artwork or other base data and modifying the base data, e.g., depending on the coordinate vector 920 (e.g., shrinking, darkening, or desaturating representations 924 as their respective coordinate vectors 920 are farther from an eye point of a 3D projection on display 204).

In some examples, operation 918 includes determining 3D coordinates (the second number of elements is three), and operation 922 includes projecting the 3D coordinates to 2D coordinates for display on a 2D display. In some examples, operation 918 includes determining 3D coordinates and projecting the 3D coordinates down to 2D coordinates (the second number of elements is two). In some examples, operation 918 includes determining 3D coordinates (the second number of elements is three), and operation 922 includes presenting the representations 924 in 3D space, e.g., using a stereoscopic (e.g., lenticular or dualscreen head-mounted), holographic, or volumetric (e.g., dual-laser upconversion) display.

At 926, the interface module 230 can receive, via UI 202, a selection 928 of a first representation 924(1) of the respective representations 924. The first representation 924(1) can be associated with a first event 906(1). For example, selection 928 can include a click or button-press event associated with a position within a bounding region (e.g., box) of representation 924(1), a box-drag or corner-click event or event sequence that produces a box wholly (or partly, in some examples) enclosing the bounding region of representation 924(1), or a lasso-drag or vertex-click event or event sequence that produces a region (e.g., a freehand region or a polygon) wholly (or partly) enclosing the bounding region of representation 924(1). In some examples using clusters, e.g., as in the following discussion of operation 930, the selection 928 can indicate a cluster 932.

At 930, the clustering subsystem 248 can cluster the events 906 of the plurality 908 of events based at least in part on the plurality of event vectors 914 to assign each event 906(k) to a cluster 932(c) of a plurality of clusters 932(1)-932(C) (individually or collectively referred to with reference 932). The plurality of clusters can include a first cluster 932(C). Examples are discussed herein, e.g., with reference to operations 328, 516, 614, 722, or 806. Operation 930 can include clustering the event vectors 914 or the coordinate vectors 920 (e.g., reduced event vectors 804(k)).

Operation 930 can include producing a cluster map from events 906 to clusters 932, e.g., a LUT, an event map from clusters 932 to events 906, e.g., a LUT, or both. A cluster map or event map can be unidirectional or bidirectional. For example, operation 930 can include producing a bidirectional event map between clusters 932 and events 906, e.g., an assignment matrix with rows for clusters 932 and columns for events 906.

In some examples, operation 922 includes presenting a bounding region (e.g., bounding box or polygon) over or in association with representation 924(1). For example, operation 922 can be performed after operation 930, and can include presenting a bounding region of first cluster 932(C) (which includes representation 924(1) of first event 906(1)) on the display 204. The bounding region can be presented, e.g., in response to a mouse-enter or -hover event with respect to the bounding region. The bounding region can be defined in 3D or 2D space. In some examples, operation 926 can include receiving a click, drag-around, drag-across, or other event indicating selection of the bounding region. This can permit selecting an entire cluster 932(c) for tagging (operation 940) more rapidly, and with reduced error, compared to some prior schemes such as selecting each representation 924(i) individually.

In some examples, each representation 924(k) includes a point, circle, or other geometric shape representing the corresponding event 906(k). In some examples, each representation 924(k) has a color associated with (e.g., indicating) the cluster 932(c) into which the corresponding event 906(k) has been clustered.

At 934, the interface module 230 can determine a first cluster (in the depicted example, cluster 932(C)) of the plurality of clusters 932 based at least in part on the selection 928. The first cluster 932(C) can include the first event 906(1). For example, the interface module 230 can perform a forward lookup in a cluster map or a reverse lookup in an event map (operation 930).

At 936, the interface module 230 or communications module 232 can receive, via the UI 202, an indication of a tag 938. In some examples not shown, operation 936 is performed before or concurrently with operation 926. Tag 938 can include data indicating a classification 116, output 242, indication 538, classification 714, or other information to be associated with first event 906(1) or first cluster 932(C). Examples of tag 938 can include data indicating "unknown," "dirty," "clean," "to be analyzed," or other tags or classifications described herein with reference to, e.g., FIGS. 1 and 7.

In some examples, operation 936 can include receiving a button-press event from a UI control, e.g., a button, associated with the tag 938; a selection of tag 938 from a set of choices presented via a radio-button or list-view control; a keypress associated with tag 938 (e.g., Ctrl+Enter to tag "Resolved"); or a click event for which buttons or modifiers indicate tag 938 (e.g., left-click for tag "dirty," right-click for tag "clean", or left-click for tag "dirty," Shift+left-click for tag "clean").

In some examples, operations 926 and 936 are mutually independent: neither requires as input an output of the other. Therefore, operations 926 and 936 in these examples (and, likewise, other mutually independent sets of operations described herein) can be performed in either order, in parallel, or at least partly overlapping in time, in various examples. Similarly, operation 930 is mutually independent of operation 918, or of each of operations 918, 922, 926, and 936, in some examples.

At 940, the security subsystem 250 or interface module 230 can associate each event 906 of the first cluster 932(C) (determined at operation 934) of events with the tag 938 (a "tagging" operation). For example, event records 112 associated with the event 906 of the first cluster 932(C) can be modified or updated to include data of the tag 938. Examples are discussed herein, e.g., with reference to FIG. 1 or operation 536.

Figure 10:
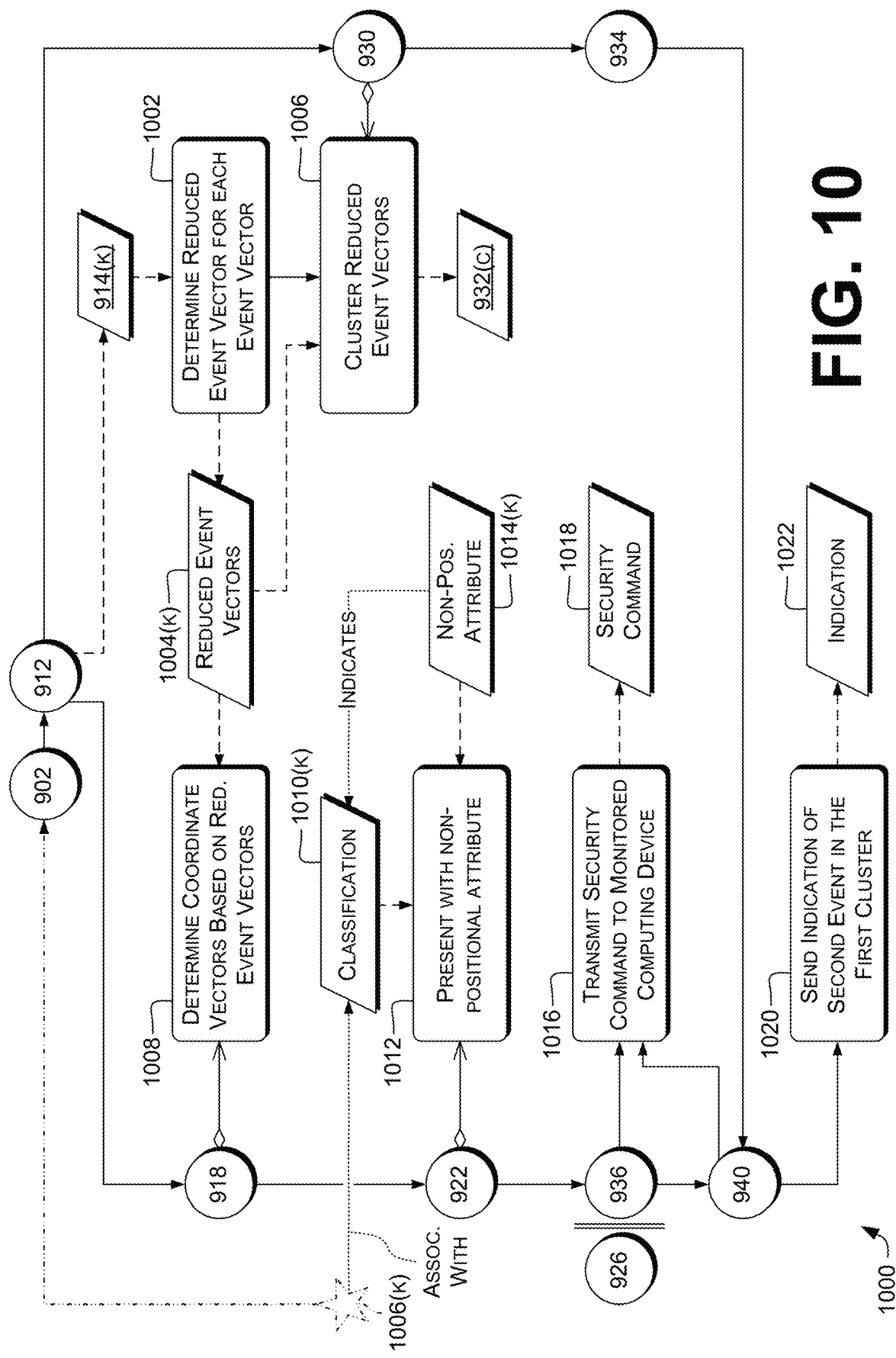
FIG. 10 is a dataflow diagram that illustrates example techniques for performing security analysis of events, presenting representations of events via a user interface, and interfacing between, e.g., a monitored computing device associated with the events and a security service.

FIG. 10 is a dataflow diagram that illustrates example techniques 1000 for analyzing events and interfacing between monitored computing devices 104 and cluster 106 (or another security service), and related dataflow (shown dashed for clarity). In some examples, techniques 1000 can be performed by a control unit, as described herein, e.g., of a computing device 102. In some examples, operation 912 can be followed by operation 1002; operation 930 can be preceded by or include operation 1002; operation 930 can include operation 1006; operation 918 can include operation 1008; operation 922 can include operation 1012; operation 936 can be followed by operation 1016; operation 940 can be followed by operation 1016; or operation 940 can be followed by operation 1020.

At 1002, reduction subsystem 246 can determine a respective reduced event vector 1004(k) for each of the respective event vectors 914(k). Each reduced event vector 1004(k) can have a third number of elements smaller than the first number of elements in the event vectors 914(k). Examples are discussed herein, e.g., with reference to operations 322, 610, 802 and reduced event vectors 324, 326, 612, 804. For example, operation 1002 can include determining the reduced event vectors 1004 at least partly by determining a t-Distributed Stochastic Neighbor Embedding (t-SNE) of the event vectors 914 in a space having a number of dimensions equal to the second number of elements. Operation 1002 can precede (as shown) or be part of operation 930.

At 1006, clustering subsystem 248 can cluster the reduced event vectors 1004 to assign each reduced event vector 1004(k), and its respective event 906(k), to a corresponding cluster 932(c) of the plurality of clusters 932. Examples are discussed herein, e.g., with reference to operations 328, 614, 806. For example, operation 1006 can include clustering the reduced event vectors using HDBSCAN.

In some examples using operation 1002, operation 918 includes operation 1008. In some of these examples, the third number of elements (in reduced event vectors 1004) is greater than the second number of elements (in coordinate vectors 920).

At 1008, the reduction subsystem 246 or other component of operation module 228, or the interface module 230, can determine the coordinate vectors 920 based at least in part on the reduced event vectors 1004. For example, each coordinate vector 920(k) can be determined by copying the respective reduced event vector 1004(k), or by projecting the respective reduced event vector 1004(k) into a lower-dimensional space (e.g., 3D→2D).

In some examples, operation 918 includes reducing directly from event vectors 914 (e.g., having 300 elements) to produce coordinate vectors 920, e.g., using t-SNE. In some of these examples, operation 930 includes clustering the event vectors 914 to determine the clusters 932. This can permit taking into account the full contents of event vectors 914 when processing.

In some other examples, operation 1008 includes reducing from already-reduced event vectors 1004 (e.g., having 100 elements) to produce coordinate vectors 920. In some of these examples, operation 1006 includes clustering the reduced event vectors 1004 to determine the clusters 932. This can reduce the amount of storage and processing resources required to determine coordinate vectors 920 or clusters 932.

The types of examples described in the two preceding paragraphs are applicable throughout this document. Accordingly, any clustering or determination of coordinate vectors described herein can be performed directly from event vectors, or from reduced event vectors.

In some examples, at least some of the events 906(k) are associated with respective classifications 1010(k) (which can represent classifications 116, 714). In some of these examples, operation 922 includes operation 1012.

At 1012, the interface module 230 or communications module 232 can present the respective representations 924 of the at least some of the events 906(k) having respective non-positional attributes 1014(k) indicating the respective classifications 1010(k). In some examples, each coordinate vector 920(k) can represent a position of the respective event 906(k) in a feature space defined by the event vectors 914 or reduced event vectors 1004. Each non-positional attribute 1014(k) can represent an attribute of the respective event 906(k), or a portion of the respective event data, not defined by that feature space. Example attributes include the cluster identifier (e.g., cluster identifier 330, 332, e.g., as discussed herein with reference to operations 328, 516) of the cluster 932 into which event 906(k) was clustered (operation 930); the classification 116 (e.g., dirty vs. clean vs. unknown, or malware vs. targeted vs. unknown) of event 906(k); identification of the monitored computing device 104 with which event 906(k) is associated (e.g., a GUID or other unique identifier); identification of a timestamp of event 906(k) (e.g., brighter or more saturated colors for more recent events 906); session ID (described herein with reference to techniques 700); or process tree (e.g., the process tree of a session, or a process tree within a session).

Example presentations of non-positional attributes 1014 include: one color per discrete value (e.g., cluster identifier, computing-device 104 identifier, or classification 116); a ramp of brightness or saturation (e.g., for timestamp); discrete sizes or a ramp of sizes (e.g., larger for more recent); or animation (e.g., moving; rotating; pulsing or otherwise changing in size, brightness or saturation; surrounded or otherwise indicated by a shrinking or expanding ring, halo, or other shape; or blinking or otherwise changing visibility over time). These presentations of non-positional attributes 1014 can additionally or alternatively be used to highlight specific events 906 or groups of events 906, e.g., as discussed herein with reference to operation 1310.

At 1016, in response to the tag 938 (received at operation 936, which may be performed in parallel with operation 926, as shown) indicating that the first cluster 932(C) of events is associated with a security violation, communications module 232 can transmit a security command 1018 to a monitored computing device 104 associated with at least one event 906 of the first cluster 932(C) of events to cause the monitored computing device 104 to perform a mitigation action. Examples are discussed herein, e.g., with reference to classification 116, result record(s) 124, output 242, operation 422, security command 424, operation 536, indication 538, operation 616, operation 812, or security command 814. Operation 1016 can be performed in response to receipt of the tag 938 at operation 936 (e.g., a click on a representation 924(k) indicating the respective event 906(k) is associated with a security violation). Operation 1016 can additionally or alternatively be performed in response to the associating at operation 940.

At 1020, communications module 232 can send, via the communications interface 236, an indication 1022 of a second event 906(2) in the first cluster 932(C) of events, the second event 906(2) being different from the first event 906(1). Operation 1020 can be performed following (as shown) or as part of operation 940. For example, events 906(1) and 906(2) may be associated with different monitored computing devices 104. Operation 1020 can include sending indication 1022 to the monitored computing device 104 associated with event 906(2) to alert that computing device 104 to the possibility of a security violation. Operation 1020 can include determining the second event 906(2), e.g., via a lookup in the results of the clustering (operation 930) to determine events 906(k) that are in the first cluster 932(C).

Figure 11:
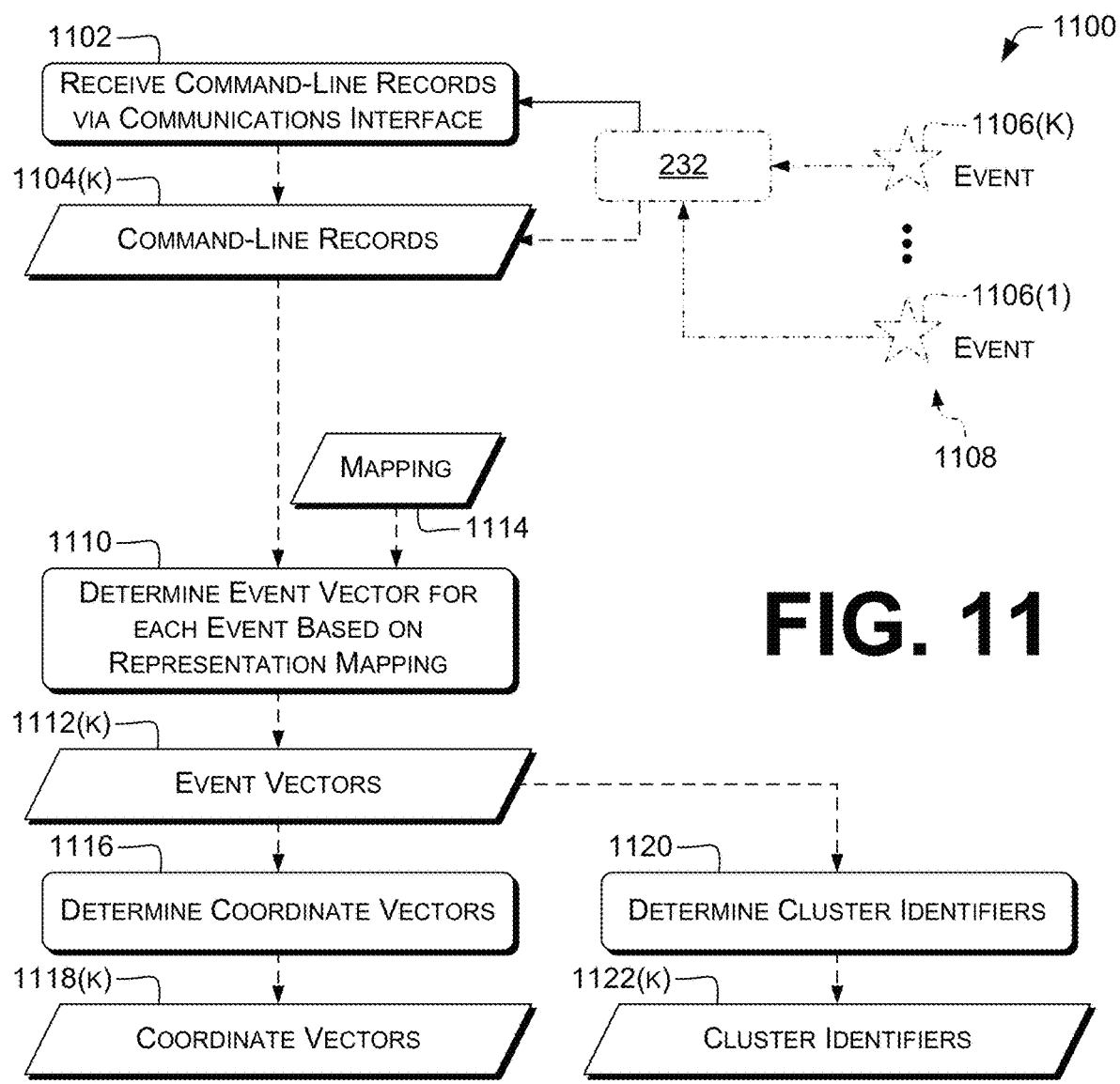
FIG. 11 is a dataflow diagram that illustrates example techniques for performing security analysis of events and determining user-interface data associated with the events.

FIG. 11 is a dataflow diagram that illustrates example techniques 1100 for performing security analyses of events, and related dataflow (shown dashed for clarity). In some examples, techniques 1100 can be performed by a control unit, as described herein, e.g., of a computing device 102.

At 1102, the communications module 232 can receive, via communications interface 236, a plurality of command-line records 1104(k) ("(k)" as in FIG. 7) associated with respective events 1106(k) of a plurality 1108 of events. Each of the events 1106(k) can be associated with a corresponding monitored computing device 104 of a plurality of monitored computing devices 104. Examples are discussed herein, e.g., with reference to operations 402, 502, 702, and 902, command-line records 306, 308, 504, 704, and 904, events 706 of plurality 708 of events, command-line text 310, 312, and command lines 508, 712, 910.

In some examples, a first command-line record 1104(1) of the plurality of command-line records 1104 is associated with a first monitored computing device 104(1) of the plurality of monitored computing devices 104. A second command-line record 1104(2) of the plurality of command-line records 1104 is associated with a second monitored computing device 104(2) of the plurality of monitored computing devices 104. Accordingly, some of these examples can permit correlating events 1106 at multiple monitored computing devices 104. This can permit more readily detecting large-scale attacks such as a targeted attack against an entire organization or significant portion thereof.

At 1110, representation subsystem 244 can determine a plurality of event vectors 1112(k) based at least in part on a trained representation mapping 1114 and on respective command-line records 1104(k) of the plurality of command-line records 1104. Each event vector 1112(k) can have a first number of elements. Examples are discussed herein, e.g., with reference to operations 314, 406-414, 510, 608, 716, 912, and event vectors 316, 318, 512, 718, 914.

At 1116, the reduction subsystem 246, the clustering subsystem 248, or another component of operation module 228, or the interface module 230, can determine, for each event vector 1112(k) of the plurality of event vectors 1112, a respective coordinate vector 1118(k) having a second number of elements smaller than the first number of elements. Examples are discussed herein, e.g., with reference to operations 322, 610, 802, 918.

At 1120, the reduction subsystem 246, the clustering subsystem 248, or another component of operation module 228, or the interface module 230, can determine, for each event vector 1112(k) of the plurality of event vectors 1112, a respective cluster identifier 1122(k) (which can represent cluster identifier 330, 332). Examples are discussed herein, e.g., with reference to operations 328, 516, 614, 722, 806, 930.

Figure 12:
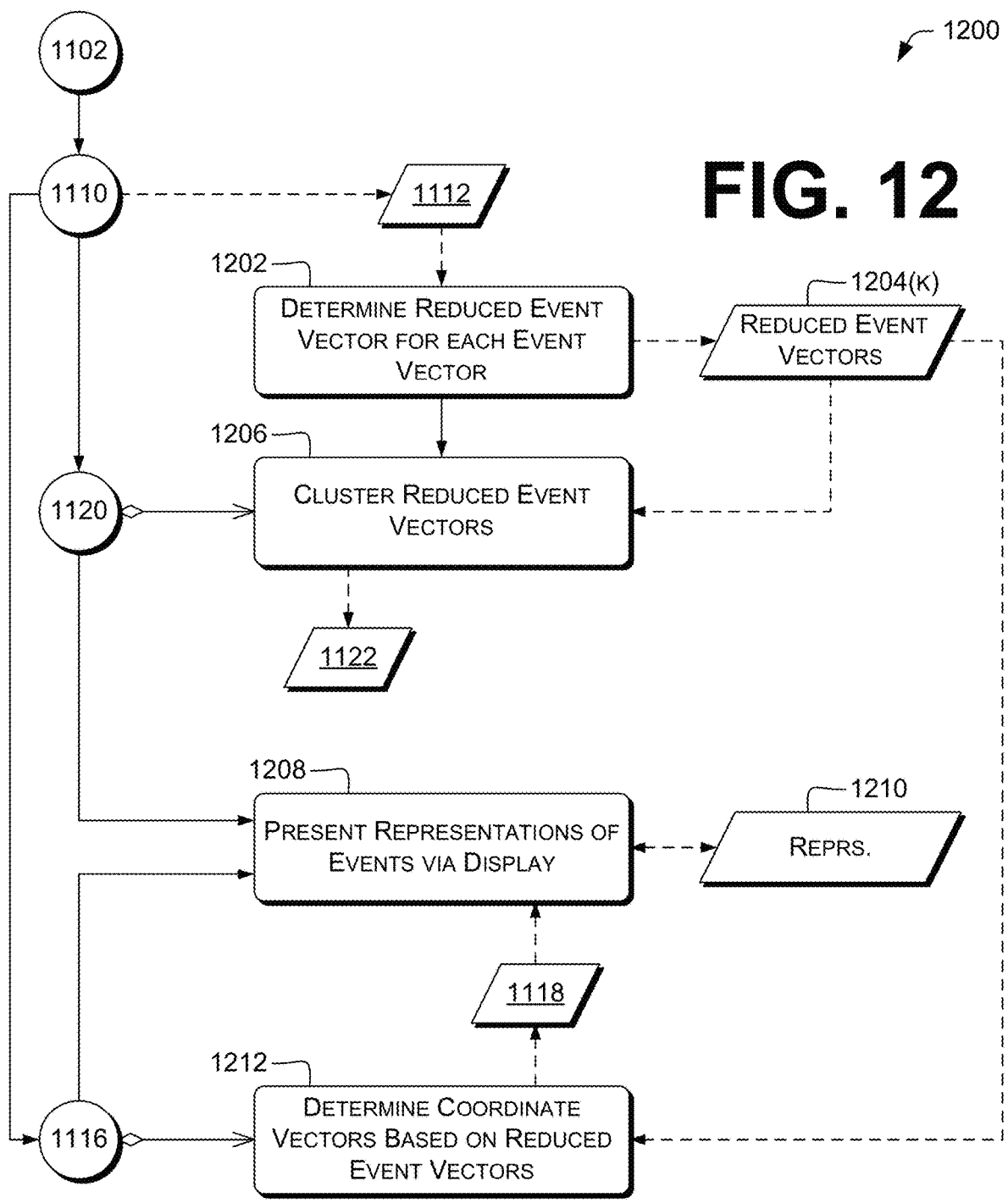
FIG. 12 is a dataflow diagram that illustrates example techniques for performing security analysis of events and presenting representations of the events.

FIG. 12 is a dataflow diagram that illustrates example techniques 1200 for performing security analyses of events and providing access via a user interface to those events, and related dataflow (shown dashed for clarity). In some examples, techniques 1200 can be performed by a control unit, as described herein, e.g., of a computing device 102. In some examples, operation 1110 can be followed by operation 1202; operation 1120 can include or be preceded by operation 1202; operation 1120 can include operation 1206; operation 1116 can include operation 1212; or operation 1116 or 1120 can be followed by operation 1208.

At 1202, the reduction subsystem 246 or the clustering subsystem 248 can determine a respective reduced event vector 1204(k) for each event vector 1112(k) of the plurality of event vectors, wherein each event vector has a third number of elements smaller than the first number of elements in the event vectors 1112. For example, t-SNE reduction can be used. Examples are discussed herein, e.g., with reference to operations 322, 610, 802, 1002 and reduced event vectors 324, 326, 612, 804, 1004.

At 1206, the clustering subsystem 248 can cluster (e.g., using HDBSCAN) the reduced event vectors 1204 to determine the respective cluster identifiers 1122 for each of the reduced event vectors 1204. Examples are discussed herein, e.g., with reference to operations 328, 614, 806, 1006. Operation 1120 can include operation 1206, or can include both operation 1202 and operation 1206.

At 1208, the interface module 230 can present, via an electronic display 204, respective representations 1210(k) of at least some events 1106(k) of the plurality 1108 of events at the respective coordinate vectors 1118(k). Examples are discussed herein, e.g., with reference to operation 922, 1012.

At 1212, the clustering subsystem 248, the reduction subsystem 246, or the interface module 230 can determine the coordinate vectors 1118 based at least in part on the respective reduced event vectors 1204. The third number of elements in the reduced event vectors 1204 can be larger than the second number of elements in the coordinate vectors 1118. For example, operation 1212 can include performing a further t-SNE, SNE, or other dimensionality-reduction operation, or projecting to reduce dimensionality (e.g., 3D-2D). Examples are discussed herein, e.g., with reference to operation 1008.

Figure 13:
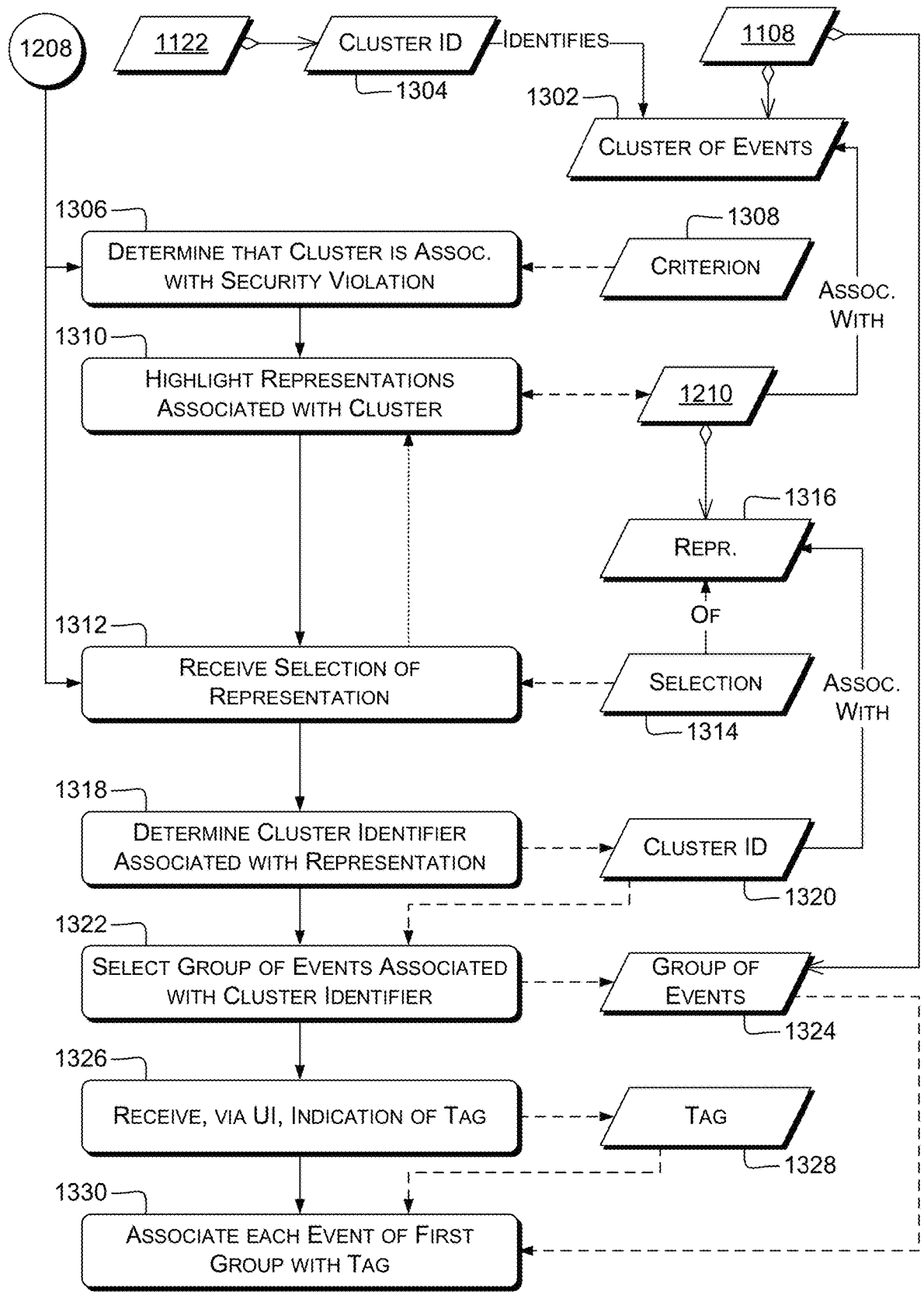
FIG. 13 is a dataflow diagram that illustrates example techniques for presenting representations of events via a user interface and processing security commands.

FIG. 13 is a dataflow diagram that illustrates example techniques 1300 for performing security analyses of events and providing access via a user interface to those events, and related dataflow (shown dashed for clarity). In some examples, techniques 1300 can be performed by a control unit, as described herein, e.g., of a computing device 102. In some examples, operation 1208 can be followed by operation 1306 or 1312. Some examples use operations 1306-1310. Some examples use operations 1312-1330. Some examples use operations 1306-1330.

In some examples, the plurality 1108 of events comprises a cluster 1302 of events. Each event 1106 in the cluster 1302 of events corresponds to a cluster identifier 1304 of the respective cluster identifiers 1122.

At 1306, the security subsystem 250 can determine that the cluster 1302 is associated with a security violation based at least in part on a predetermined criterion 1308 over the cluster 1302 being satisfied. For example, criterion 1308 can require that the majority (or another predetermined percentage, e.g., 40%, 50%, or 70%) of the events 1106 in the cluster 1302 be dirty. Examples are discussed herein, e.g., with reference to operations 418, 532, 728, At 1310, the interface module 230 can highlight, in response to the determination at operation 1306 and via the electronic display, at least some of the representations 1210 associated with the cluster 1302. Examples are discussed herein, e.g., with reference to operation 1012 and presentation of representations with non-positional attributes 1014.

In some examples, operation 1310 permits readily distinguishing cluster 1302 from other clusters or groups of events 1106 of the plurality 1108 of events. This can permit more effectively determining characteristics of cluster 1302 that distinguish it from other clusters, which can in turn permit more effectively analyzing events 1106 of the plurality 1108 of events to determine security-relevant information about those events.

At 1312, the interface module 230 can receive, via UI 202, a selection 1314 (which can represent selection 928) of a representation 1316 of the respective representations 1210. Examples are discussed herein, e.g., with reference to operation 926. Operation 1312 can be performed after the presenting (operation 1208), or after the highlighting (operation 1310).

In some examples, operation 1208 can be followed by operations 1312 and 1310, in that order, as indicated by the stippled arrow. For example, the interface module 230 can receive selection 1314 (operation 1312) and determine that the selection 1314 is associated with an event 1106(k) in cluster 1302. The interface module 230 can then highlight (operation 1310) the representations 1210(k) of at least some of the events 1106(k) in cluster 1302. For example, events 1106(k) having "unknown" classifications 116 can be highlighted. This can permit more readily determining which events 1106(k) may require further analysis.

At 1318, the clustering subsystem 248, the security subsystem 250, or the interface module 230 can determine a cluster identifier 1320 associated with the representation 1316 (and thus with the corresponding event 1106(k) of the plurality 1108 of events). Examples are discussed herein, e.g., with reference to operation 926, 1020, 1206. For example, the cluster identifier 1320 can be retrieved from the results of operation 1206.

At 1322, the clustering subsystem 248, the security subsystem 250, or the interface module 230 can select a group 1324 of events 1106 of the plurality 1108 of events, each event in the group 1324 of events associated with the cluster identifier 1320. For example, group 1324 can include some of, or all of, the events 1106 in the cluster identified by cluster identifier 1320 (e.g., cluster 1302, or another cluster 520, 724, 932). Operation 1322 can include selecting all the events 1106 associated with the cluster identifier 1320. Additionally or alternatively, operation 1322 can include selecting those events 1106(k) that are associated with both the cluster identifier 1320 and coordinate vectors 1118(k) within an area of selection 1314 (e.g., an area around which a selection box was drawn via UI 202).

At 1326, the communications module 232 or the interface module 230 can receive, via the UI 202, an indication of a tag 1328 (which can represent tag 938). Examples are discussed herein, e.g., with reference to operation 936. Operations 1312 and 1326 are mutually independent, in some examples. For example, operation 1326 can be performed before operation 1312 instead of after. Examples are discussed herein, e.g., with reference to operations 926 and 936.

At 1330, the security subsystem 250 can associate each event 1106 of the first group 1324 of events with the tag 1328. Examples are discussed herein, e.g., with reference to operation 940.

Figure 14:
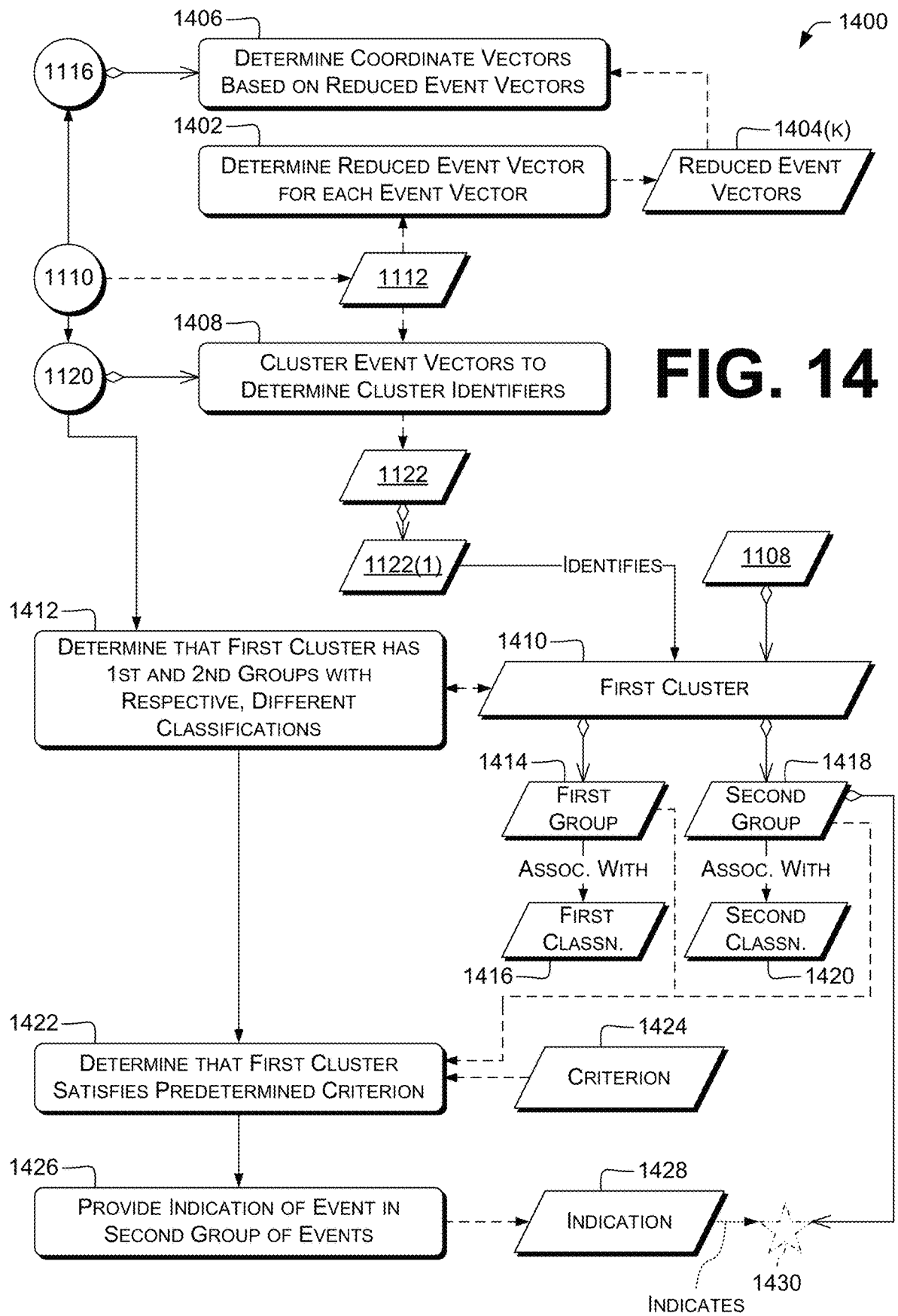
FIG. 14 is a dataflow diagram that illustrates example techniques for performing security analysis of events.

FIG. 14 is a dataflow diagram that illustrates example techniques 1400 for performing security analyses of events, and related dataflow (shown dashed for clarity). In some examples, techniques 1400 can be performed by a control unit, as described herein, e.g., of a computing device 102. In some examples, operation 1116 can be preceded by or include operation 1402; operation 1116 can include operation 1406; operation 1120 can include operation 1408; or operation 1120 can be followed by operation 1412. Some examples use operations 1408-1406. Some examples use operations 1412-1426. Some examples use operations 1408-1426.

At 1402, the reduction subsystem 246 or the clustering subsystem 248 can determine (e.g., via t-SNE) a respective reduced event vector 1404(k) for each event vector 1112(k) of the plurality of event vectors. Each reduced event vector 1404 can have a third number of elements smaller than the first number of elements in each of the event vectors 1112. Examples are discussed herein, e.g., with reference to operations 322, 610, 802, 1002, 1202 and reduced event vectors 324, 326, 612, 804, 1004, 1204.

At 1406, the reduction subsystem 246 or the interface module 230 can determine the respective coordinate vectors 1118(k) based at least in part on the respective reduced event vectors 1404(k). For example, operation 1406 can include copying, reducing, or projecting the reduced event vectors 1404 to determine the coordinate vectors 1118. Examples are discussed herein, e.g., with reference to operations 1008, 1212. This can reduce the processing requirements of determining coordinate vectors 1118.

At 1408, the clustering subsystem 248 or the reduction subsystem 246 can cluster (e.g., via HDBSCAN) the event vectors 1112(k) to determine the respective cluster identifiers 1122(k). Examples are discussed herein, e.g., with reference to operations 328, 516, 614, 722, 806, 930. This can permit determining clusters using more of the information from each event vector 1112 than is present, e.g., in reduced event vectors 1404.

In some examples, the plurality 1108 of events comprises a first cluster 1410 of events 1106. Each event 1106 in the first cluster 1410 of events 1106 corresponds to a first cluster identifier 1122(1) of the respective cluster identifiers 1122. Some examples permit detecting events 1106(k) that may have been mis-classified by other processing.

At 1412, the security subsystem 250 or the clustering subsystem 248 can determine that the first cluster 1410 of events comprises at least a first group 1414 of events (e.g., the majority of the events) associated with a first classification 1416 and a second group 1418 of events (e.g., a minority of the events) associated with a second classification 1420 different from the first classification 1416. Examples are discussed herein, e.g., with reference to operation 522, first group 524, and second group 528.

At 1422, the security subsystem 250 or the clustering subsystem 248 can determine that the first cluster 1410 of events satisfies a predetermined criterion 1424 over the first cluster based at least in part on at least: the number of events 1106 in the first group 1414 of events; or the number of events 1106 in the second group 1418 of events. Examples are discussed herein, e.g., with reference to operation 532.

At 1426, the interface module 230 or communications module 232 can, in response to the determining that the first cluster 1410 satisfies the predetermined criterion 1424, provide an indication 1428 of at least one event 1430 of the events 1106 in the second group 1418 of events. Examples are discussed herein, e.g., with reference to operation 536. For example, operation 1426 can include providing the indication 1428 via communications interface 236 (e.g., by sending a network message containing indication 1428), or via display 204 or another component of UI 202 (e.g., by highlighting a representation 1210, 1316 of event 1430, e.g., as discussed herein with reference to operation 1310). Additionally or alternatively, operation 1426 can include tagging or otherwise updating event data associated with event 1430 to include indication 1428 (e.g., a tag). Examples are discussed herein, e.g., with reference to operations 536, 940.

In some examples, a computer-security system (e.g., including a computing device 102, 200) includes a computer-readable memory (e.g., 212, 214) storing a representation mapping 222 (or 320, 514, 720, 916, 1114) and a communications interface 236. The system can include a control unit configured to perform operations of FIGS. 11-14. Some example systems are configured to perform at least one of, or all of, the following groups of operations: 1102-1120; 1208 and 1312; 1318-1330; 1208, 1312, and 1318-1330; or 1202 and 1206. Some example systems configured to perform operations 1208 and 1312 include an electronic display (e.g., display 204), a user-input device (e.g., user-operable input device 206), and a user-interface subsystem (e.g., interface module 230) configured to perform those operations.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method of determining that a first event of a plurality of events is associated with a security violation, wherein: the plurality of events further includes a second event associated with a security violation; the first event is associated with a monitored computing device; each event of the plurality of events is associated with a respective command-line record; and the method comprises: for each event of the plurality of events, determining a respective event vector based at least in part on at least a portion of the respective command-line record and on a trained representation mapping, wherein each event vector has a first number of elements; determining a respective reduced event vector for each of the respective event vectors, wherein each reduced event vector has a second number of elements smaller than the first number of elements; clustering the reduced event vectors to determine a respective cluster identifier for each of the reduced event vectors, wherein the first event is associated with a first cluster identifier and the second event is associated with a second cluster identifier; and determining that the first event is associated with a security violation based at least in part on the first cluster identifier matching the second cluster identifier.

B: The method according to paragraph A, further comprising: receiving event data from the monitored computing device via a network, the event data comprising at least some of the command-line record associated with the first event; and in response to the determining that the first cluster identifier matches the second cluster identifier, transmitting a security command to the monitored computing device to cause the monitored computing device to perform a mitigation action.

C: The method according to paragraph A or B, wherein: the plurality of events comprises a first cluster of the events; each event in the first cluster is associated with the first cluster identifier; and the method further comprises determining that the first event is associated with a security violation further based at least in part on the first cluster of the events satisfying at least one predetermined criterion.

D: The method according to any of paragraphs A-C, wherein: the trained representation mapping comprises an x2vec mapping; and the method comprises: determining the reduced event vectors at least partly by determining a t-Distributed Stochastic Neighbor Embedding (t-SNE) of the event vectors in a space having a number of dimensions equal to the second number of elements; and the clustering comprises clustering the reduced event vectors using Hierarchical Density-Based Spatial Clustering of Applications with Noise (HDBSCAN).

E: The method according to any of paragraphs A-D, wherein: the respective command-line record for each event comprises at least two command lines associated with that event; and the at least two command lines associated with the event comprise: a command line of a first process, the first process being a process that triggered the event; a command line of a second process that is a parent process of the first process; and a command line of a third process that is a parent process of the second process.

F: The method according to any of paragraphs A-E, further comprising: extracting at least two terms from the respective command-line record associated with the first event; and determining the respective event vector based at least in part on the at least two respective terms.

G: The method according to paragraph F, wherein: the respective command-line record for each event comprises at least two command lines associated with that event; and the method further comprises extracting the at least two terms at least partly by: extracting, from a first command line of the at least two command lines, a contiguous sequence of non-punctuation characters as a first term of the at least two terms; and extracting, from the first command line, a contiguous sequence of punctuation characters as a second term of the at least two terms.

H: At least one tangible, non-transitory computer-readable medium having stored thereon instructions executable by at least one processor to cause the at least one processor to perform operations comprising: receiving, via a communications interface, a plurality of command-line records associated with respective events of a plurality of events, wherein: each of the command-line records is associated with a corresponding monitored computing device of a plurality of monitored computing devices; determining a plurality of event vectors based at least in part on a trained representation mapping and on respective command-line records of the plurality of command-line records; clustering the events of the plurality of events based at least in part on the plurality of event vectors to assign each event to a cluster of a plurality of clusters, the plurality of clusters comprising a first cluster; determining that the first cluster comprises at least a relatively larger first group of events associated with a first classification and a relatively smaller second group of events associated with a second, different classification; determining that the first cluster satisfies a predetermined criterion based at least in part on at least: the number of events in the first group of events; or the number of events in the second group of events; and providing, via the communications interface and in response to the determining that the first cluster satisfies the predetermined criterion, an indication of a first event in the second group of events.

I: The at least one tangible, non-transitory computer-readable medium according to paragraph H, the operations further comprising: determining each event vector having a first number of elements; clustering the events at least partly by: determining a respective reduced event vector for each of the event vectors, wherein each reduced event vector has a second number of elements smaller than the first number of elements; and clustering the reduced event vectors to assign each reduced event vector, and its respective event, to a corresponding cluster of the plurality of clusters.

J: The at least one tangible, non-transitory computer-readable medium according to paragraph I, the operations further comprising: determining the reduced event vectors at least partly by determining a t-Distributed Stochastic Neighbor Embedding (t-SNE) of the event vectors in a space having a number of dimensions equal to the second number of elements; and clustering the reduced event vectors using Hierarchical Density-Based Spatial Clustering of Applications with Noise (HDBSCAN).

K: The at least one tangible, non-transitory computer-readable medium according to any of paragraphs H-J, wherein the plurality of command-line records comprises: a first command-line record associated with a first monitored computing device of the plurality of monitored computing devices; and a second command-line record associated with a second, different monitored computing device of the plurality of monitored computing devices.

L: The at least one tangible, non-transitory computer-readable medium according to any of paragraphs H-K, the operations further comprising: receiving, via the communications interface: a first command-line record of the plurality of command-line records, the first command-line record associated with the first event; and an indication that the first event is benign; and subsequently, providing the indication that the first event is associated with a security violation.

M: The at least one tangible, non-transitory computer-readable medium according to any of claims H-L, wherein the respective command-line record for each event comprises at least two command lines associated with that event.

N: A method comprising: receiving, via a communications interface, a plurality of command-line records, wherein: each command-line record represents a respective event of a plurality of events; each event of the plurality of events is associated with a respective command-line record, with a corresponding monitored computing device, and with a corresponding session at the corresponding monitored computing device; and each event is associated with a respective classification; determining a plurality of event vectors using a stored representation mapping and based at least in part on respective command-line records of the plurality of command-line records; clustering the events of the plurality of events based at least in part on the plurality of event vectors to assign each event to a cluster of a plurality of clusters, wherein each cluster of a first subset of the plurality of clusters includes at least one event that is associated with a first session; determining, for each cluster in the first subset of the plurality of clusters, whether that cluster is associated with a security violation based at least in part on at least some of the classifications of the events included in that cluster; and determining that the first session is associated with a security violation based at least in part on the first subset of the plurality of clusters satisfying a predetermined criterion.

O: The method according to paragraph N, further comprising determining that a first cluster of the plurality of clusters is associated with a security violation based at least in part on the respective classifications of at least some of the events in the first cluster satisfying a second predetermined criterion different from the predetermined criterion.

P: The method according to paragraph O, wherein: the predetermined criterion is satisfied by at least a predetermined percentage of the clusters in the first subset of the plurality of clusters being associated with a security violation; the predetermined percentage is at least thirty percent; the second predetermined criterion is satisfied by at least a second predetermined percentage of the events in the first cluster being associated with a security violation; and the second predetermined percentage is at least thirty percent.

Q: The method according to paragraph O or P, further comprising: determining that a second cluster of the plurality of clusters includes an event associated with the first session, wherein the first subset of the plurality of clusters excludes the second cluster; and determining, in response to the determining that the first session is associated with a security violation and to the determining that the second cluster of the plurality of clusters includes an event associated with the first session, that the second cluster is associated with a security violation.

R: The method according to any of paragraphs N-Q, wherein: each event is associated with a respective process that has a respective ancestor process; each command-line record comprises a respective first command line associated with the process; and each command-line record comprises a respective second command line associated with the ancestor process;

S: The method according to any of paragraphs N-R, wherein: the first session comprises a non-daemon process and a daemon process; and the non-daemon process is the process that spawned the daemon process.

T: The method according to any of paragraphs N-S, wherein each of the event vectors has a first number of elements and the method further comprises: determining respective reduced event vectors for each of the plurality of event vectors, each of the reduced event vectors having a second number of elements less than the first number of elements, at least partly by determining a t-Distributed Stochastic Neighbor Embedding (t-SNE) of the event vectors in a space having a number of dimensions equal to the second number of elements; and clustering the events at least partly by clustering the reduced event vectors using Hierarchical Density-Based Spatial Clustering of Applications with Noise (HDBSCAN).

U: The method according to any of paragraphs N-T, further comprising, in response to the determining that the first session is associated with a security violation, transmitting a security command to monitored computing device that is associated with the first session to cause the monitored computing device to perform a mitigation action.

V: The method according to any of claims N-U, wherein the respective command-line record for each event comprises at least two command lines associated with that event.

W: A method, comprising: receiving, via a communications interface, a plurality of command-line records associated with respective events of a plurality of events, wherein: each of the command-line records is associated with a corresponding monitored computing device of a plurality of monitored computing devices; determining a plurality of event vectors based at least in part on a trained representation mapping and on respective command-line records of the plurality of command-line records, each event vector having a first number of elements; determining, for each of the plurality of event vectors, a respective coordinate vector having a second number of elements smaller than the first number of elements; presenting, via an electronic display, respective representations of at least some events of the plurality of events at the respective coordinate vectors; receiving, via a user interface (UI), a selection of a first representation of the respective representations, the first representation associated with a first event; clustering the events of the plurality of events based at least in part on the plurality of event vectors to assign each event to a cluster of a plurality of clusters; determining a first cluster of the plurality of clusters based at least in part on the selection, wherein the first cluster includes the first event; receiving, via the UI, an indication of a tag; and associating each event of the first cluster of events with the tag.

X: The method according to paragraph W, further comprising sending, via the communications interface, an indication of a second event in the first cluster of events, the second event being different from the first event.

Y: The method according to paragraph W or X, further comprising, in response to the tag indicating that the first cluster of events is associated with a security violation, transmitting a security command to a monitored computing device associated with at least one event of the first cluster of events to cause the monitored computing device to perform a mitigation action.

Z: The method according to any of paragraphs W-Y, wherein at least some of the events are associated with respective classifications, the presenting comprising presenting the respective representations of the at least some of the events having respective non-positional attributes indicating the respective classifications.

AA: The method according to any of paragraphs W-Z, further comprising clustering the events at least partly by: determining a respective reduced event vector for each of the respective event vectors, wherein each reduced event vector has a third number of elements smaller than the first number of elements; and clustering the reduced event vectors to assign each reduced event vector, and its respective event, to a corresponding cluster of the plurality of clusters.

AB: The method according to paragraph AA, further comprising: determining the reduced event vectors at least partly by determining a t-Distributed Stochastic Neighbor Embedding (t-SNE) of the event vectors in a space having a number of dimensions equal to the third number of elements; and clustering the reduced event vectors using Hierarchical Density-Based Spatial Clustering of Applications with Noise (HDBSCAN).

AC: The method according to paragraph AA or AB, wherein: the third number of elements is greater than the second number of elements; and the method further comprises determining the coordinate vectors based at least in part on the reduced event vectors.

AD: The method according to any of paragraphs W-AC, wherein the first representation comprises a bounding region of the first cluster.

AE: The method according to any of claims W-AD, wherein the respective command-line record for each event comprises at least two command lines associated with that event.

AF: At least one tangible, non-transitory computer-readable medium having stored thereon instructions executable by at least one processor to cause the at least one processor to perform operations comprising: receiving, via a communications interface, a plurality of command-line records associated with respective events of a plurality of events, each of the events associated with a corresponding monitored computing device of a plurality of monitored computing devices, wherein: a first command-line record of the plurality of command-line records is associated with a first monitored computing device of the plurality of monitored computing devices; and a second command-line record of the plurality of command-line records is associated with a second monitored computing device of the plurality of monitored computing devices; determining a plurality of event vectors based at least in part on a trained representation mapping and on respective command-line records of the plurality of command-line records, each event vector having a first number of elements; and determining, for each of the plurality of event vectors: a respective cluster identifier; and a respective coordinate vector having a second number of elements smaller than the first number of elements.

AG: The at least one tangible, non-transitory computer-readable medium according to paragraph AF, the operations further comprising presenting, via an electronic display, respective representations of at least some events of the plurality of events at the respective coordinate vectors.

AH: The at least one tangible, non-transitory computer-readable medium according to paragraph AG, the operations further comprising, after the presenting: receiving, via a user interface (UI), a selection of a first representation of the respective representations; determining a first cluster identifier associated with the first representation; selecting a first group of events of the plurality of events, each event in the first group of events associated with the first cluster identifier; receiving, via the UI, an indication of a tag; and associating each event of the first group of events with the tag.

AI: The at least one tangible, non-transitory computer-readable medium according to paragraph AG or AH, wherein: the plurality of events comprises a first cluster of events; each event in the first cluster of events corresponds to a first cluster identifier of the respective cluster identifiers; and the operations further comprise: determining that the first cluster is associated with a security violation based at least in part on a predetermined criterion over the first cluster; and highlighting, in response and via the electronic display, at least some of the representations associated with the first cluster.

AJ: The at least one tangible, non-transitory computer-readable medium according to any of paragraphs AF-AI, wherein: the plurality of events comprises a first cluster of events; each event in the first cluster of events corresponds to a first cluster identifier of the respective cluster identifiers; and the operations further comprise: determining that the first cluster of events comprises at least a first group of events associated with a first classification and a second group of events associated with a second classification different from the first classification; determining that the first cluster of events satisfies a predetermined criterion over the first cluster based at least in part on at least: the number of events in the first group of events; or the number of events in the second group of events; and providing, in response, an indication of at least one of the events in the second group of events.

AK: The at least one tangible, non-transitory computer-readable medium according to any of paragraphs AF-AJ, the operations further comprising determining the respective cluster identifiers at least partly by: determining a respective reduced event vector for each event vector of the plurality of event vectors, wherein each event vector has a third number of elements smaller than the first number of elements; and clustering the reduced event vectors to determine the respective cluster identifiers for each of the reduced event vectors.

AL: The at least one tangible, non-transitory computer-readable medium according to paragraph AK, wherein: the operations further comprise determining the coordinate vectors based at least in part on the respective reduced event vectors; and the third number of elements is larger than the second number of elements.

AM: The at least one tangible, non-transitory computer-readable medium according to any of paragraphs AF-AL, the operations further comprising: clustering the event vectors to determine the respective cluster identifiers; determining a respective reduced event vector for each event vector of the plurality of event vectors, wherein each reduced event vector has a third number of elements smaller than the first number of elements; and determining the respective coordinate vectors based at least in part on the respective reduced event vectors.

AN: A computer-security system, comprising: a computer-readable memory storing a representation mapping; a communications interface configured to receive a plurality of command-line records associated with respective events of a plurality of events, each of the events associated with a corresponding monitored computing device of a plurality of monitored computing devices, wherein: a first command-line record of the plurality of command-line records is associated with a first monitored computing device of the plurality of monitored computing devices; and a second command-line record of the plurality of command-line records is associated with a second monitored computing device of the plurality of monitored computing devices; a representation subsystem configured to determine a plurality of event vectors using the representation mapping and based at least in part on respective command-line records of the plurality of command-line records, each event vector having a first number of elements; and a clustering subsystem configured to determine, for each of the plurality of event vectors: a respective cluster identifier; and a respective coordinate vector having a second number of elements smaller than the first number of elements.

AO: The computer-security system according to paragraph AN, further comprising: an electronic display; a user input device; and a user-interface subsystem configured to: present, via an electronic display, respective representations of at least some events of the plurality of events at the respective coordinate vectors; and receive, via a user interface (UI), a selection of a first representation of the respective representations.

AP: The computer-security system according to paragraph AO, wherein: the system further comprises a security subsystem configured to: determine a first cluster identifier associated with the first representation; select a first group of events of the plurality of events, each event in the first group of events associated with the first cluster identifier; the user-interface subsystem is further configured to receive, via the UI, an indication of a tag; and the system is further configured to associate each event of the first group of events with the tag.

AQ: The computer-security system according to any of paragraphs AN-AP, the clustering subsystem configured to determine the respective cluster identifiers at least partly by: determining a respective reduced event vector for each event vector of the plurality of event vectors, wherein each event vector has a third number of elements smaller than the first number of elements; and clustering the reduced event vectors to determine the respective cluster identifiers for each of the reduced event vectors.

AR: Any of A-AQ, wherein the communications interface consists of a network interface.

AS: A computer-readable medium, e.g., a computer storage medium, having thereon computer-executable instructions, the computer-executable instructions upon execution configuring a computer to perform operations as any of paragraphs A-G, H-M, N-V, W-AE, AF-AM, AN-AQ, or AR recites.

AT: A device comprising: a processor; and a computer-readable medium, e.g., a computer storage medium, having thereon computer-executable instructions, the computer-executable instructions upon execution by the processor configuring the device to perform operations as any of paragraphs A-G, H-M, N-V, W-AE, AF-AM, AN-AQ, or AR recites.

AU: A system comprising: means for processing; and means for storing having thereon computer-executable instructions, the computer-executable instructions including means to configure the system to carry out a method as any of paragraphs A-G, H-M, N-V, W-AE, AF-AM, AN-AQ, or AR recites.

AV: Any of the preceding, with each occurrence of "at least two command lines" and similar text replaced with "at least one command line".

CONCLUSION

Various techniques described herein, e.g., for performing security analyses of events 126, can permit more efficiently determining a classification of an event. Various examples can reduce the time or memory requirements of software to determine classifications while maintaining or improving the accuracy of such determinations. Various examples provide automated detection of security violations (e.g., targeted attacks or malware-related events) with higher confidence levels than some previous schemes. This increased confidence can permit making triage decisions based on classifications provided by systems herein (e.g., classifications 116, outputs 242, or indications 538, 606, 818, 1022, 1428). Accordingly, security resources can be directed to events 302 more likely to be associated with security violations. This can reduce waste of security resources and can permit more quickly responding to violations.

Some examples may provide any of, or none of, the benefits listed herein, or other benefits. The claims are not limited to examples providing the benefits described above, and at least one embodiment may provide benefits that are not any of the benefits described above. Furthermore, the claimed subject matter is not limited to implementations that solve any or all disadvantages noted in any part of this disclosure.

The word "or" and the phrase "or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," or any of those phrases with "or" substituted for "or," unless specifically stated otherwise, is to be understood as signifying that an item, term, etc. can be either X, or Y, or Z, or a combination of any elements thereof (e.g., a combination of XY, XZ, YZ, or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" is synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed examples. For example, computing devices 102 or 104, network 108, processing unit(s) 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example techniques or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described techniques. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, techniques, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer OS 216. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described techniques can be performed by resources associated with one or more computing device(s) 102, 104, or 200, such as one or more internal or external CPUs or GPUs, or one or more pieces of hardware logic such as FPGAs, DSPs, or other types of accelerators.

What is claimed is:

1. A method of determining that a first event of a plurality of events is associated with a security violation, wherein:
    the plurality of events further includes a second event associated with a security violation;
    the first event is associated with a monitored computing device;
    each event of the plurality of events is associated with a respective command-line record; and
    the method comprises:
        for each event of the plurality of events, determining a respective event vector based at least in part on at least a portion of the respective command-line record and on a trained representation mapping, wherein each event vector has a first number of elements;
        determining a respective reduced event vector for each of the respective event vectors, wherein each reduced event vector has a second number of elements smaller than the first number of elements;
        clustering the reduced event vectors to determine a respective cluster identifier for each of the reduced event vectors, wherein the first event is associated with a first cluster identifier and the second event is associated with a second cluster identifier; and
        determining that the first event is associated with a security violation based at least in part on the first cluster identifier matching the second cluster identifier.

2. The method according to claim 1, further comprising:
    receiving event data from the monitored computing device via a network, the event data comprising at least some of the command-line record associated with the first event; and
    in response to the determining that the first cluster identifier matches the second cluster identifier, transmitting a security command to the monitored computing device to cause the monitored computing device to perform a mitigation action.

3. The method according to claim 1, wherein:
    the plurality of events comprises a first cluster of the events;
    each event in the first cluster is associated with the first cluster identifier; and
    the method further comprises determining that the first event is associated with a security violation further based at least in part on the first cluster of the events satisfying at least one predetermined criterion.

4. The method according to claim 1, wherein:
    the trained representation mapping comprises an x2vec mapping; and
    the method comprises:
        determining the reduced event vectors at least partly by determining a t-Distributed Stochastic Neighbor Embedding (t-SNE) of the event vectors in a space having a number of dimensions equal to the second number of elements; and
        the clustering comprises clustering the reduced event vectors using Hierarchical Density-Based Spatial Clustering of Applications with Noise (HDBSCAN).

5. The method according to claim 1, wherein:
the respective command-line record for each event comprises at least two command lines associated with that event; and
the at least two command lines associated with the event comprise:
a command line of a first process, the first process being a process that triggered the event;
a command line of a second process that is a parent process of the first process; and
a command line of a third process that is a parent process of the second process.

6. The method according to claim 1, further comprising:
extracting at least two terms from the respective command-line record associated with the first event; and
determining the respective event vector based at least in part on the at least two respective terms.

7. The method according to claim 6, wherein:
the respective command-line record for each event comprises at least two command lines associated with that event; and
the method further comprises extracting the at least two terms at least partly by:
extracting, from a first command line of the at least two command lines, a contiguous sequence of non-punctuation characters as a first term of the at least two terms; and
extracting, from the first command line, a contiguous sequence of punctuation characters as a second term of the at least two terms.

8. At least one tangible, non-transitory computer-readable medium having stored thereon instructions executable by at least one processor to cause the at least one processor to perform operations comprising:
receiving, via a communications interface, a plurality of command-line records associated with respective events of a plurality of events, wherein:
each of the command-line records is associated with a corresponding monitored computing device of a plurality of monitored computing devices;
determining a plurality of event vectors based at least in part on a trained representation mapping and on respective command-line records of the plurality of command-line records;
determining a respective reduced event vector for each of the event vectors based at least in part on a projection of the respective event vector;
clustering the events of the plurality of events based at least in part on the respective reduced event vector for each of the event vectors to assign each event to a cluster of a plurality of clusters, the plurality of clusters comprising a first cluster;
determining that the first cluster comprises at least a relatively larger first group of events associated with a first classification and a relatively smaller second group of events associated with a second, different classification;
determining that the first cluster satisfies a predetermined criterion based at least in part on at least:
the number of events in the first group of events; or
the number of events in the second group of events; and
providing, via the communications interface and in response to the determining that the first cluster satisfies the predetermined criterion, an indication of a first event in the second group of events.

9. The at least one tangible, non-transitory computer-readable medium according to claim 8, wherein:
each event vector has a first number of elements;
each of the reduced event vectors has a second number of elements smaller than the first number of elements; and
the operations further comprising:
clustering the events at least partly by clustering the reduced event vectors to assign each reduced event vector, and its respective event, to a corresponding cluster of the plurality of clusters.

10. The at least one tangible, non-transitory computer-readable medium according to claim 9, the operations further comprising:
determining the reduced event vectors at least partly by determining a t-Distributed Stochastic Neighbor Embedding (t-SNE) of the event vectors in a space having a number of dimensions equal to the second number of elements; and
clustering the reduced event vectors using Hierarchical Density-Based Spatial Clustering of Applications with Noise (HDBSCAN).

11. The at least one tangible, non-transitory computer-readable medium according to claim 8, wherein the plurality of command-line records comprises:
a first command-line record associated with a first monitored computing device of the plurality of monitored computing devices; and
a second command-line record associated with a second, different monitored computing device of the plurality of monitored computing devices.

12. The at least one tangible, non-transitory computer-readable medium according to claim 8, the operations further comprising:
receiving, via the communications interface:
a first command-line record of the plurality of command-line records, the first command-line record associated with the first event; and
an indication that the first event is benign; and
subsequently, providing the indication that the first event is associated with a security violation.

13. A method comprising:
receiving, via a communications interface, a plurality of command-line records, wherein:
each command-line record represents a respective event of a plurality of events;
each event of the plurality of events is associated with a respective command-line record, with a corresponding monitored computing device, and with a corresponding session at the corresponding monitored computing device; and
each event is associated with a respective classification;
determining a plurality of event vectors using a stored representation mapping and based at least in part on respective command-line records of the plurality of command-line records, each of the event vectors has a first number of elements;
determining a respective reduced event vector for each of the plurality of event vectors, each of the respective reduced event vectors having a second number of elements less than the first number of elements;
clustering the events of the plurality of events based at least in part on the respective reduced event vectors to assign each event to a cluster of a plurality of clusters, wherein each cluster of a first subset of the plurality of clusters includes at least one event that is associated with a first session;

determining, for each cluster in the first subset of the plurality of clusters, whether that cluster is associated with a security violation based at least in part on at least some of the classifications of the events included in that cluster; and determining that the first session is associated with a security violation based at least in part on the first subset of the plurality of clusters satisfying a predetermined criterion.

14. The method according to claim 13, further comprising determining that a first cluster of the plurality of clusters is associated with a security violation based at least in part on the respective classifications of at least some of the events in the first cluster satisfying a second predetermined criterion different from the predetermined criterion.

15. The method according to claim 14, wherein:

the predetermined criterion is satisfied by at least a predetermined percentage of the clusters in the first subset of the plurality of clusters being associated with a security violation;

the predetermined percentage is at least thirty percent;

the second predetermined criterion is satisfied by at least a second predetermined percentage of the events in the first cluster being associated with a security violation; and the second predetermined percentage is at least thirty percent.

16. The method according to claim 14, further comprising:

determining that a second cluster of the plurality of clusters includes an event associated with the first session, wherein the first subset of the plurality of clusters excludes the second cluster; and determining, in response to the determining that the first session is associated with a security violation and to the determining that the second cluster of the plurality of clusters includes an event associated with the first session, that the second cluster is associated with a security violation.

17. The method according to claim 13, wherein:

each event is associated with a respective process that has a respective ancestor process;

each command-line record comprises a respective first command line associated with the process; and each command-line record comprises a respective second command line associated with the ancestor process.

18. The method according to claim 13, wherein:

the first session comprises a non-daemon process and a daemon process; and the non-daemon process is the process that spawned the daemon process.

19. The method according to claim 13, wherein:

determining respective reduced event vectors for each of the plurality of event vectors at least partly by determining a t-Distributed Stochastic Neighbor Embedding (t-SNE) of the event vectors in a space having a number of dimensions equal to the second number of elements; and clustering the events at least partly by clustering the reduced event vectors using Hierarchical Density-Based Spatial Clustering of Applications with Noise (HDBSCAN).

20. The method according to claim 13, further comprising, in response to the determining that the first session is associated with a security violation, transmitting a security command to monitored computing device that is associated with the first session to cause the monitored computing device to perform a mitigation action.

* * * * *